US010607247B2

(12) United States Patent
Winters et al.

(10) Patent No.: US 10,607,247 B2
(45) Date of Patent: *Mar. 31, 2020

(54) SYSTEMS AND METHODS TO ENHANCE SEARCH RESULTS USING TRANSACTION DATA OF MERCHANTS

(71) Applicant: Visa International Service Association, San Francisco, CA (US)

(72) Inventors: Michelle Eng Winters, Belmont, CA (US); Vipul Bahety, Sunnyvale, CA (US); Kevin Akerman, Orinda, CA (US)

(73) Assignee: Visa International Service Association, San Francisco, CA (US)

( * ) Notice: Subject to any disclaimer, the term of this patent is extended or adjusted under 35 U.S.C. 154(b) by 81 days.

This patent is subject to a terminal disclaimer.

(21) Appl. No.: 16/033,481

(22) Filed: Jul. 12, 2018

(65) Prior Publication Data

US 2018/0322520 A1   Nov. 8, 2018

Related U.S. Application Data

(63) Continuation of application No. 14/189,824, filed on Feb. 25, 2014.

(Continued)

(51) Int. Cl.
*G06Q 40/00* (2012.01)
*G06Q 30/02* (2012.01)

(52) U.S. Cl.
CPC ..... *G06Q 30/0226* (2013.01); *G06Q 30/0255* (2013.01)

(58) Field of Classification Search
CPC .................. G06Q 30/0226; G06Q 30/0255
See application file for complete search history.

(56) References Cited

U.S. PATENT DOCUMENTS 6,108,639 A    8/2000  Walker et al.
6,332,126 B1  12/2001  Peirce et al.
(Continued)

FOREIGN PATENT DOCUMENTS

WO          9922328         5/1999
WO          0137183 A1      5/2001
WO       2009035469 A1      3/2009

OTHER PUBLICATIONS

Al-Shameri, F. (2006). Automated generation of metadata for mining image and text data (Order No. 3198908). Available from ProQuest Dissertations & Theses Global; SciTech Premium Collection. (304917250). Retrieved from https://search.proquest.com/docview/304917250?accountid=14753.*

(Continued)

*Primary Examiner* — Muriel S Tinkler
(74) *Attorney, Agent, or Firm* — The Webb Law Firm

(57) ABSTRACT

A computing apparatus includes: a transaction handler configured to process transactions in a payment processing network; a data warehouse configured to store transaction data recording the transactions processed at the transaction handler; a profile generator configured to generate, based on the transaction data, a profile including business activity data configured to identify a time period of active business, and a portal configured to communicate with a search engine to enhance search results using the business activity data.

20 Claims, 9 Drawing Sheets

Related U.S. Application Data

(60) Provisional application No. 61/808,812, filed on Apr. 5, 2013.

(56) References Cited

U.S. PATENT DOCUMENTS

| | | | |
|---|---|---|---|
| 6,587,835 | B1 | 7/2003 | Treyz et al. |
| 6,592,033 | B2 | 7/2003 | Jennings et al. |
| 6,684,195 | B1 | 1/2004 | Deaton et al. |
| 6,868,393 | B1 | 3/2005 | Demsky et al. |
| 7,107,226 | B1 | 9/2006 | Cassidy et al. |
| 7,107,227 | B1 | 9/2006 | Bezos et al. |
| 7,127,415 | B1 | 10/2006 | Verchere |
| 7,181,438 | B1 | 2/2007 | Szabo |
| 7,200,566 | B1 | 4/2007 | Moore et al. |
| 7,606,764 | B1 * | 10/2009 | Mancini ............... G06Q 20/10 705/17 |
| 7,747,300 | B1 | 6/2010 | de Barros |
| 7,788,293 | B2 | 8/2010 | Pasztor et al. |
| 8,175,908 | B1 | 5/2012 | Anderson |
| 2001/0014868 | A1 | 8/2001 | Herz et al. |
| 2001/0032128 | A1 | 10/2001 | Kepecs |
| 2001/0049636 | A1 | 12/2001 | Hudda et al. |
| 2001/0056395 | A1 | 12/2001 | Khan |
| 2002/0026380 | A1 | 2/2002 | Su |
| 2002/0052782 | A1 | 5/2002 | Landesmann |
| 2002/0120496 | A1 | 8/2002 | Scroggie et al. |
| 2002/0161670 | A1 | 10/2002 | Walker et al. |
| 2002/0178070 | A1 | 11/2002 | Leveridge |
| 2002/0194069 | A1 | 12/2002 | Thakur et al. |
| 2003/0004743 | A1 | 1/2003 | Callegari |
| 2003/0065805 | A1 | 4/2003 | Barnes, Jr. |
| 2003/0083961 | A1 | 5/2003 | Bezos et al. |
| 2003/0177058 | A1 | 9/2003 | Needham |
| 2004/0064351 | A1 | 4/2004 | Mikurak |
| 2004/0162889 | A1 | 8/2004 | Morris et al. |
| 2005/0055281 | A1 | 3/2005 | Williams |
| 2005/0144111 | A1 | 6/2005 | Manstein et al. |
| 2005/0149385 | A1 | 7/2005 | Trively |
| 2005/0159974 | A1 | 7/2005 | Moss et al. |
| 2005/0187873 | A1 | 8/2005 | Labrou et al. |
| 2005/0199707 | A1 | 9/2005 | Beck et al. |
| 2006/0015414 | A1 | 1/2006 | Congram et al. |
| 2006/0143080 | A1 | 6/2006 | Garg et al. |
| 2006/0167753 | A1 | 7/2006 | Teague et al. |
| 2006/0190348 | A1 | 8/2006 | Ofer et al. |
| 2006/0212355 | A1 | 9/2006 | Teague et al. |
| 2006/0223505 | A1 | 10/2006 | Starr et al. |
| 2006/0231611 | A1 | 10/2006 | Chakiris et al. |
| 2006/0293971 | A1 | 12/2006 | Hunter et al. |
| 2007/0005419 | A1 | 1/2007 | Horvitz et al. |
| 2007/0031245 | A1 | 2/2007 | Ruthemeyer et al. |
| 2007/0150334 | A1 | 6/2007 | Bergh et al. |
| 2007/0150352 | A1 | 6/2007 | Kelly-Frank et al. |
| 2007/0192183 | A1 | 8/2007 | Monaco et al. |
| 2007/0210155 | A1 | 9/2007 | Swartz et al. |
| 2007/0288312 | A1 * | 12/2007 | Wang ................ G06Q 30/0214 705/14.16 |
| 2008/0021767 | A1 | 1/2008 | Benson et al. |
| 2008/0154694 | A1 | 6/2008 | Litzow et al. |
| 2008/0156873 | A1 | 7/2008 | Wilhelm et al. |
| 2008/0263035 | A1 | 10/2008 | Episale et al. |
| 2008/0300973 | A1 | 12/2008 | DeWitt et al. |
| 2008/0319843 | A1 | 12/2008 | Moser et al. |
| 2009/0076896 | A1 | 3/2009 | DeWitt et al. |
| 2009/0076925 | A1 | 3/2009 | DeWitt et al. |
| 2010/0274680 | A1 | 10/2010 | Carlson et al. |
| 2010/0287103 | A1 | 11/2010 | Mason |
| 2011/0231223 | A1 | 9/2011 | Winters |
| 2011/0313858 | A1 | 12/2011 | DeWitt et al. |
| 2012/0059718 | A1 * | 3/2012 | Ramer ............... G06Q 30/0247 705/14.53 |
| 2012/0215612 | A1 | 8/2012 | Ramer et al. |
| 2013/0134962 | A1 | 5/2013 | Kamel et al. |
| 2014/0236678 | A1 | 8/2014 | Akerman et al. |
| 2014/0244353 | A1 | 8/2014 | Winters |

OTHER PUBLICATIONS

Berg, G. L. (1997). Interface design guidelines for world wide web planning initiatives (Order No. MM20308). Available from ProQuest Dissertations & Theses Global. (304338447). Retrieved from https://search.proquest.com/docview/304338447?accountid =14753.*

Al-Shameri, "Automated Generation of Metadata for Mining Image and Text Data", Available from ProQuest Dissertations & Theses Global; SciTech Premium Collection, 2006, No. 304917250, Retrieved from https://search.proquest.com/docview/304917250?accountid=14753.

Berg, "Interface Design Guidelines for World Wide Web Planning Initiatives", Available from ProQuest Dissertations & Theses Global, 1997, No. 304338447, Retrieved from https://search.proquest.com/docview/304338447? accountid=14753.

European Patent Application No. 07854595.1, Search Report, dated Dec. 16, 2010.

European Patent Application No. 07864052.1, Extended Search Report, dated Dec. 22, 2010.

International Patent Application PCT/US07/83946, International Search Report and Written Opinion, dated Mar. 4, 2008.

International Patent Application PCT/US07/83963, International Search Report and Written Opinion, dated Mar. 4, 2008.

International Patent Application PCT/US07/83973, International Search Report and Written Opinion, dated May 5, 2008.

International Patent Application PCT/US07/83983, International Search Report and Written Opinion, dated Mar. 28, 2008.

* cited by examiner

SYSTEMS AND METHODS TO ENHANCE SEARCH RESULTS USING TRANSACTION DATA OF MERCHANTS

RELATED APPLICATIONS

The present application is a continuation of U.S. patent application Ser. No. 14/189,824, filed Feb. 25, 2014 and entitled "Systems and Methods to Enhance Search Results Using Transaction Data of Merchants," which claims the benefit of U.S. Prov. Pat. App. No. 61/808,812, filed Apr. 5, 2013 and entitled "Systems and Methods to Enhance Search Results using Transaction Data of Merchants", the entire disclosures of which are hereby incorporated herein by reference.

The present application relates to U.S. patent application Ser. No. 13/900,420, filed May 22, 2013, entitled "Systems and Methods to Enhance Search via Transaction Data", and U.S. Pat. App. Pub. No. 2011/0087547, published Apr. 14, 2011 and entitled "Systems and Methods for Advertising Services Based on a Local Profile", the entire discloses of which applications are hereby incorporated herein by reference.

FIELD OF THE TECHNOLOGY

At least some embodiments of the present disclosure relate to data processing in general and more specifically but not limited to, search and transaction data, such as records of payments made via credit cards, debit cards, prepaid cards, etc.

BACKGROUND

Millions of transactions occur daily through the use of payment cards, such as credit cards, debit cards, prepaid cards, etc. Corresponding records of the transactions are recorded in databases for settlement and financial record-keeping (e.g., to meet the requirements of government regulations). Such data can be mined and analyzed for trends, statistics, and other analyses. Sometimes such data are mined for specific advertising goals, such as to provide targeted offers to account holders, as described in PCT Pub. No. WO 2008/067543 A2, published on Jun. 5, 2008 and entitled "Techniques for Targeted Offers."

U.S. Pat. App. Pub. No. 2009/0216579, published on Aug. 27, 2009 and entitled "Tracking Online Advertising using Payment Services," discloses a system in which a payment service identifies the activity of a user using a payment card as corresponding with an offer associated with an online advertisement presented to the user.

U.S. Pat. No. 6,298,330, issued on Oct. 2, 2001 and entitled "Communicating with a Computer Based on the Offline Purchase History of a Particular Consumer," discloses a system in which a targeted advertisement is delivered to a computer in response to receiving an identifier, such as a cookie, corresponding to the computer.

U.S. Pat. No. 7,035,855, issued on Apr. 25, 2006 and entitled "Process and System for Integrating Information from Disparate Databases for Purposes of Predicting Consumer Behavior," discloses a system in which consumer transactional information is used for predicting consumer behavior.

U.S. Pat. No. 6,505,168, issued on Jan. 7, 2003 and entitled "System and Method for Gathering and Standardizing Customer Purchase Information for Target Marketing," discloses a system in which categories and sub-categories are used to organize purchasing information by credit cards, debit cards, checks and the like. The customer purchase information is used to generate customer preference information for making targeted offers.

U.S. Pat. No. 7,444,658, issued on Oct. 28, 2008 and entitled "Method and System to Perform Content Targeting," discloses a system in which advertisements are selected to be sent to users based on a user classification performed using credit card purchasing data.

U.S. Pat. App. Pub. No. 2005/0055275, published on Mar. 10, 2005 and entitled "System and Method for Analyzing Marketing Efforts," discloses a system that evaluates the cause and effect of advertising and marketing programs using card transaction data.

U.S. Pat. App. Pub. No. 2008/0217397, published on Sep. 11, 2008 and entitled "Real-Time Awards Determinations," discloses a system for facilitating transactions with real-time awards determinations for a cardholder, in which the award may be provided to the cardholder as a credit on the cardholder's statement.

The disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

DETAILED DESCRIPTION

Introduction

Figure 1:
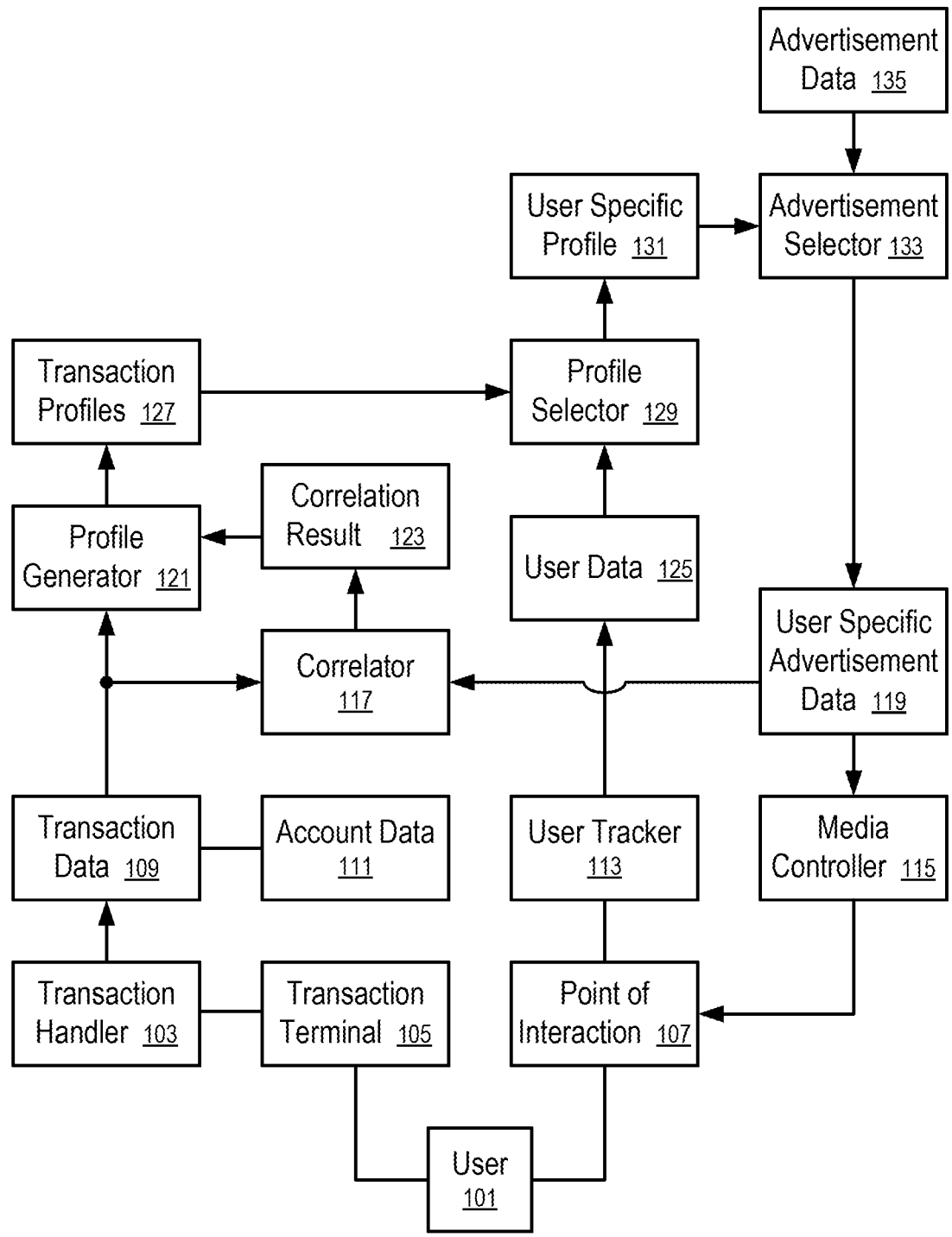
FIG. 1 illustrates a system to provide services based on transaction data according to one embodiment.

In one embodiment, transaction data of merchants are processed to generate business activity information and/or business activity patterns of the merchants to assist search engines to select, customize, personalize, and/or prioritize search results according to the search context and/or the preferences of the users of the search engines. For example, active business hours of a merchant can be derived from the timing of the earliest transaction in a day and the latest transaction in a day. Further, statistical data indicating the transaction volume as a function of time of the day, day of the week, week of the month, etc., can be used to predict the business hours, days the store is closed (e.g., holidays), peak business times, etc. The statistical data can be provided to a search engine for extraction of customized business intelligence information regarding the merchant. Alternatively, a centralized platform coupled with a transaction handler is configured to extract the relevant business intelligence information and provide such information directly to the search engine, periodically or in real time in response to a request from the search engine. Further details and examples are provided below in general and more specifically in the section entitled "SEARCH & BUSINESS ACTIVITY."

Transaction data, such as records of transactions made via credit accounts, debit accounts, prepaid accounts, bank accounts, stored value accounts and the like, can be further processed to optionally provide information for various services, such as reporting, benchmarking, advertising, content or offer selection, customization, personalization, prioritization, etc. In one embodiment of improving privacy protections, users are required to enroll in a service program and provide consent to allow the system to use related transaction data and/or other data for the related services, and the system is configured to provide the services while protecting the privacy of the users in accordance with the enrollment agreement and user consent.

For example, based on the transaction data, an advertising network in one embodiment is provided to present personalized or targeted advertisements/offers on behalf of advertisers. A computing apparatus of, or associated with, the transaction handler uses the transaction data and/or other data, such as account data, merchant data, search data, social networking data, web data, etc., to develop intelligence information about individual customers, or certain types or groups of customers. The intelligence information can be used to select, identify, generate, adjust, prioritize, and/or personalize advertisements/offers to the customers. The transaction handler may be further automated to process the advertisement fees charged to the advertisers, using the accounts of the advertisers, in response to the advertising activities.

Search & Business Activity

In one embodiment, business activity data derived from transaction statistics is used to enhance search results. A computing apparatus identifies a set of transactions of a merchant, determines transaction statistics of the set of transactions, and causes search results to be enhanced based on the transaction statistics. The transactions can be identified from transaction data recorded by a transaction handler of a payment processing network that processes the transactions of the merchant to make payments on behalf of customers of the merchant for purchasing from the merchant.

The transaction statistics, for example, may include times indicative of business hours of the merchant in a business day, an indication of a peak portion of a business time period, and/or an indicator of whether the merchant is currently active in business.

In one embodiment, in response to receiving a search term from a user, a computing apparatus is configured to customize a search result based on business activity data of merchants generated from transaction data recorded for payment transactions processed in a payment processing network.

For examples, payment transaction data of a merchant, or a group of merchants, such as a set of merchants in a geographical region and/or in a merchant category, can be aggregated and/or analyzed to generate a transaction profile of the merchant, or the group of merchants. Techniques disclosed in the sections entitled "AGGREGATED SPENDING PROFILE" and "AGGREGATED REGION PROFILE" can be used to generate the transaction profile. The transaction profile can be used to assist a search engine to select, prioritize and/or customize search results to match the spending preferences of users who may be interested in products and/or services of the merchant or merchants.

The transaction profile of a merchant in one embodiment includes data indicating the business hours of the merchants.

For example, the transaction records of the merchant within a predetermined period of time (e.g., a week, two weeks, a month) is analyzed to determine the earliest transaction in a business day and the latest transaction in the business day, which provides an indication of active business hours of the merchant in a typical business day.

For example, the distribution of the transactions of the merchant within a period of time (e.g., a week, two weeks, a month, a quarter, a year) is determined according to the business time during the day to determine a statistical starting point of time during a business day for payment transactions submitted from the transaction terminal(s) of the merchant, as well as a statistical ending point of time during the business day for payment transactions submitted from the transaction terminal(s) of the merchant. The statistical starting point and the statistical ending point are indicative the active business hours of the merchant.

The transaction profile of the merchant provided to the search engine may include the active business hours of the merchant derived from the earliest transaction in a business day and the latest transaction in the business day, or the statistical starting and ending points of time in the business day. Alternatively or in combination, the transaction profile of the merchant includes the active business hours of the merchant derived from the earliest transaction in a business day and the latest transaction in the business day, or the statistical starting and ending points of time in the business day, as determined from the statistical analysis of the transactions of the merchant.

The statistical analysis of the transactions of the merchant can further determine the business patterns of the merchant during hours within a business day, days within a week or month, weeks or months within a quarter or year, etc. The business patterns indicate the peak business hours during which the retail location of the merchant may be crowded, and/or the services may be delayed. Offers may be provided to invite the users to visit the merchant location at off-peak hours in the day, off-peak days in a week or month, etc. to assist balancing of consumer traffic and managing inventory.

The statistical analysis of the transactions of the merchant can further determine the inactive time periods (e.g., hours in the day, days in a week or month or year). The retail location of the merchant may be closed for business during holidays, non-business hours, maintenance periods, and/or for other reasons. When a specific, recurring time period (e.g., a particular time window within a day, week, month or year) is statistically observed to have no payment transactions, the specific, recurring time period can be determined to be non-business time periods of the merchant, which information can be useful in meeting the needs of the users of the search engine.

The transaction patterns of the merchants can be monitored to identify significant changes in the business activities of the merchant. For example, a change in business hours can be detected from the change of transaction patterns over a period of time. For example, when the daily transaction count of the merchant drops to below a threshold, the merchant may be flagged for the possibility of going out of business. For example, when the count of transactions of the merchant is zero for a period of time over a threshold (e.g., a week, a month or quarter), the merchant can be flagged for being out of business. Thus, based on the transaction counts, a set of merchants can be classified as being active (e.g., still in business) or inactive (e.g., out of business, or temporarily closed).

Figure 12:
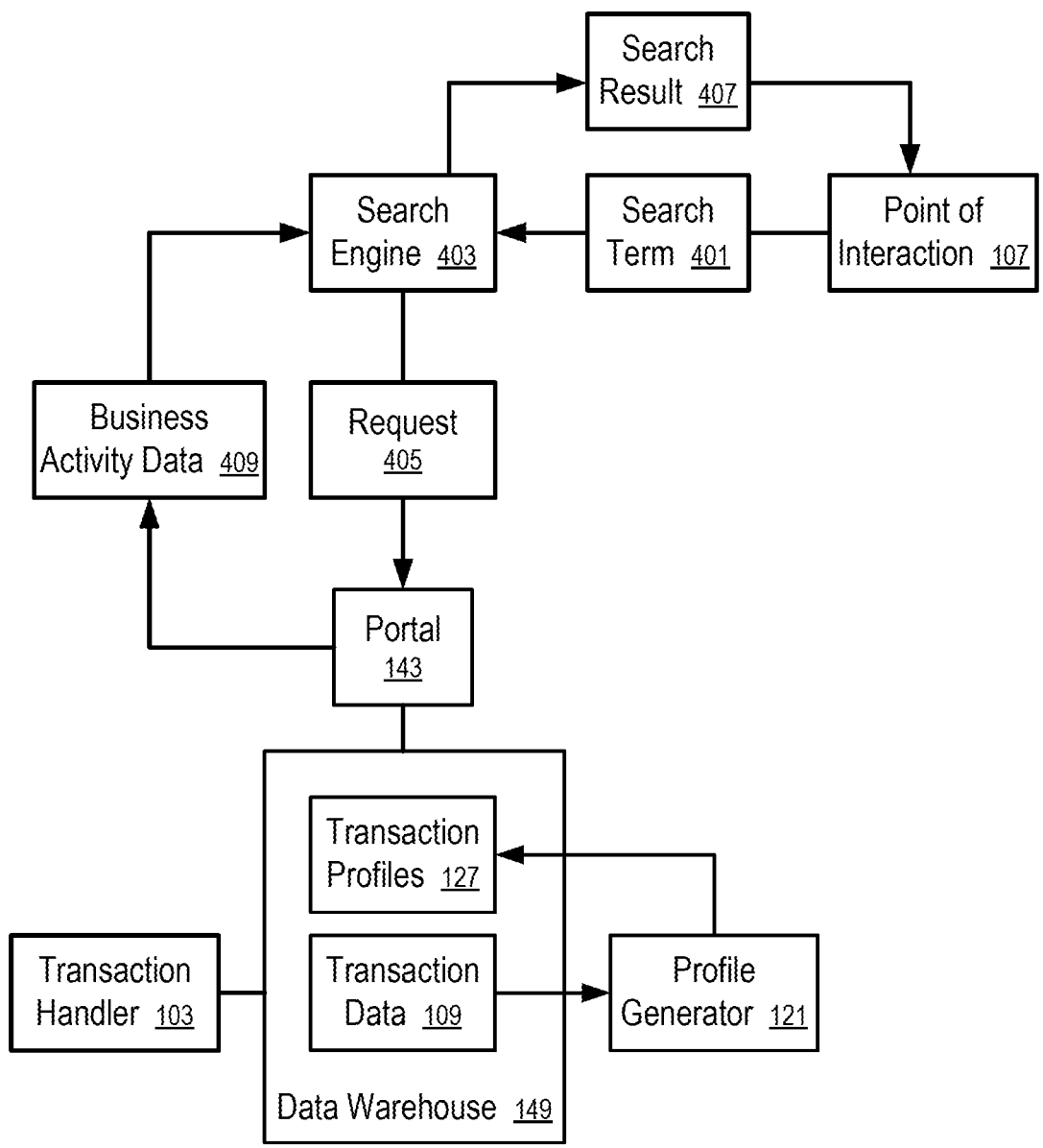
FIG. 12 shows a system to enhance search via transaction data according to one embodiment.

FIG. 12 shows a system to enhance search via transaction data according to one embodiment. In FIG. 12, a search engine (403) is configured to receive a search term (401) from a point of interaction (107) for a search submitted from a user.

In one embodiment, the search engine (403) is configured to transmit, to a portal (143) coupled with the data warehouse (149), a request (405) for business activity data (409). The request (405) may identify a specific merchant, or a group of merchants, such as merchants in a geographical region and/or merchants in a merchant category.

In one embodiment, the request (405) is transmitted in response to the receiving of the search term (401) from the point of interaction (107). Alternatively, or in combination, the request (405) can be made periodically to cache the business activity data (409). In some embodiments, an arrangement is made to allow the portal (143) to deliver periodic updates of the business activity data (409) without explicit requests (e.g., 405) from the search engine (405).

Figure 4:
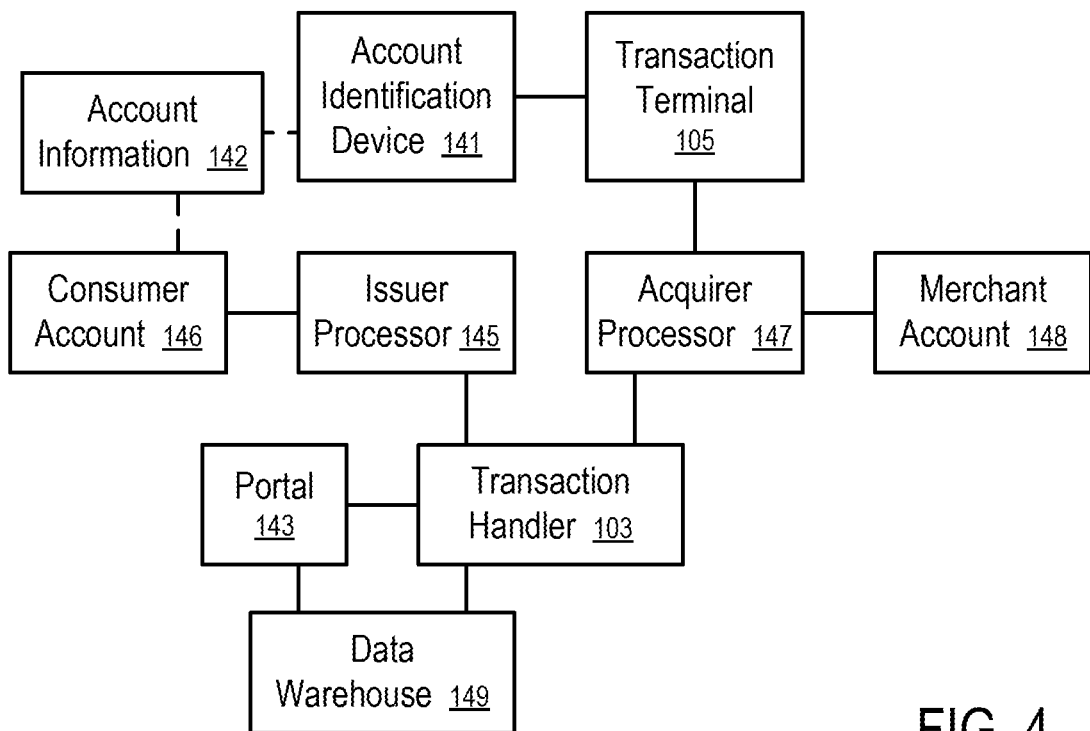
FIG. 4 shows a system to provide information based on transaction data according to one embodiment.

In FIG. 12, the search engine (403) is configured to communicate with a portal (143) coupled with the data warehouse (149). A transaction handler (103) is coupled with the data warehouse (149) to store transaction data (109) recording the transactions processed by the transaction handler (103) (e.g., processed in a way as illustrated in FIG. 4). Alternatively, the transaction data (109) may be provided by other processors of a payment processing network, such as an acquirer processor (147) or an issuer processor (145) as illustrated in FIG. 4, or other payment processors.

Figure 2:
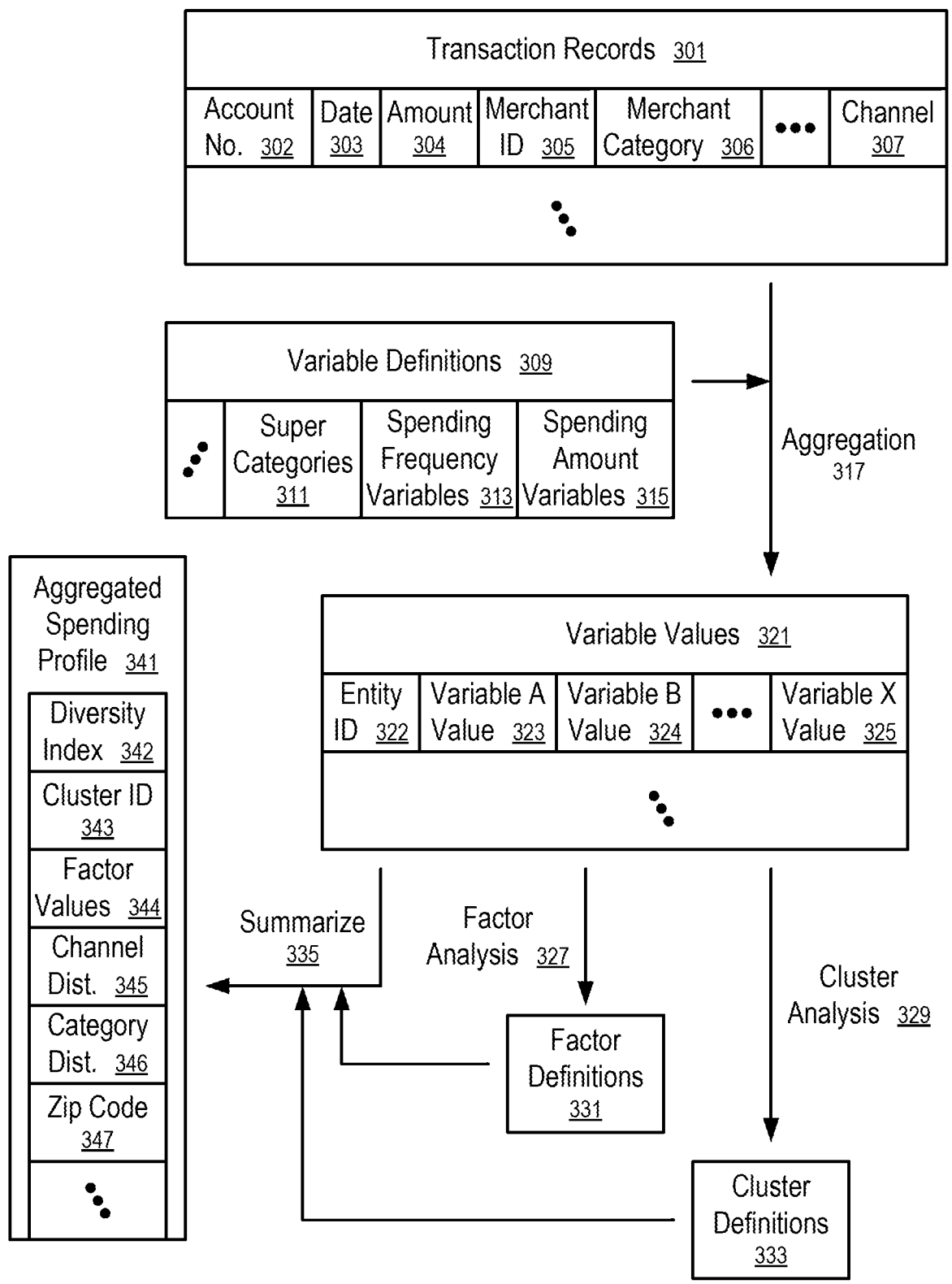
FIG. 2 illustrates the generation of an aggregated spending profile according to one embodiment.

In FIG. 12, a profile generator (121) is configured to generate transaction profiles (127) from the transaction data (109) in ways as illustrated in FIG. 2 and/or discussed above. For example, the profile generator (121) may identify the earliest transaction in a business day, the latest transaction in the business day, the statistical starting and ending points of time in the business day, active business hours of the merchant, inactive time periods of the merchant, transaction volumes as a function of business hours within a day, days within a week, month or year, etc., and whether the merchant is considered active (e.g., still in business) or inactive (e.g., out of business, or temporarily closed).

In FIG. 12, after the search engine (403) submits the request (405) to the portal (143), the business activity data (409) (e.g., as extracted from the transaction profile (127) of the merchant, or as part of the transaction profile (127) of merchant) is provided to the search engine (403).

In one embodiment, the business activity data (409) includes the active business hours of the merchant and/or whether the merchant is considered active (e.g., still in business) or inactive (e.g., out of business, or temporarily closed), as determined from the transactions of the merchant within a past period of time (e.g., a week, a month, a quarter, a year). The business activity data (409) may further include statistical data such as the earliest transaction in a business day, the latest transaction in the business day, the statistical starting and ending points of time in the business day, statistical active business hours of the merchant, statistical inactive time periods of the merchant, statistical transaction volumes as a function of business hours within a day, days within a week, month or year, statistical peak time periods and off-peak time periods, average transaction amount and its variation over various time periods, such as hours in a day, days in a week, month or year.

The business activity data (409) allows the search engine (403) to enhance, customize, prioritize, and personalize the search results (407) for the search term (401) received from the point of interaction (107).

Figure 13:
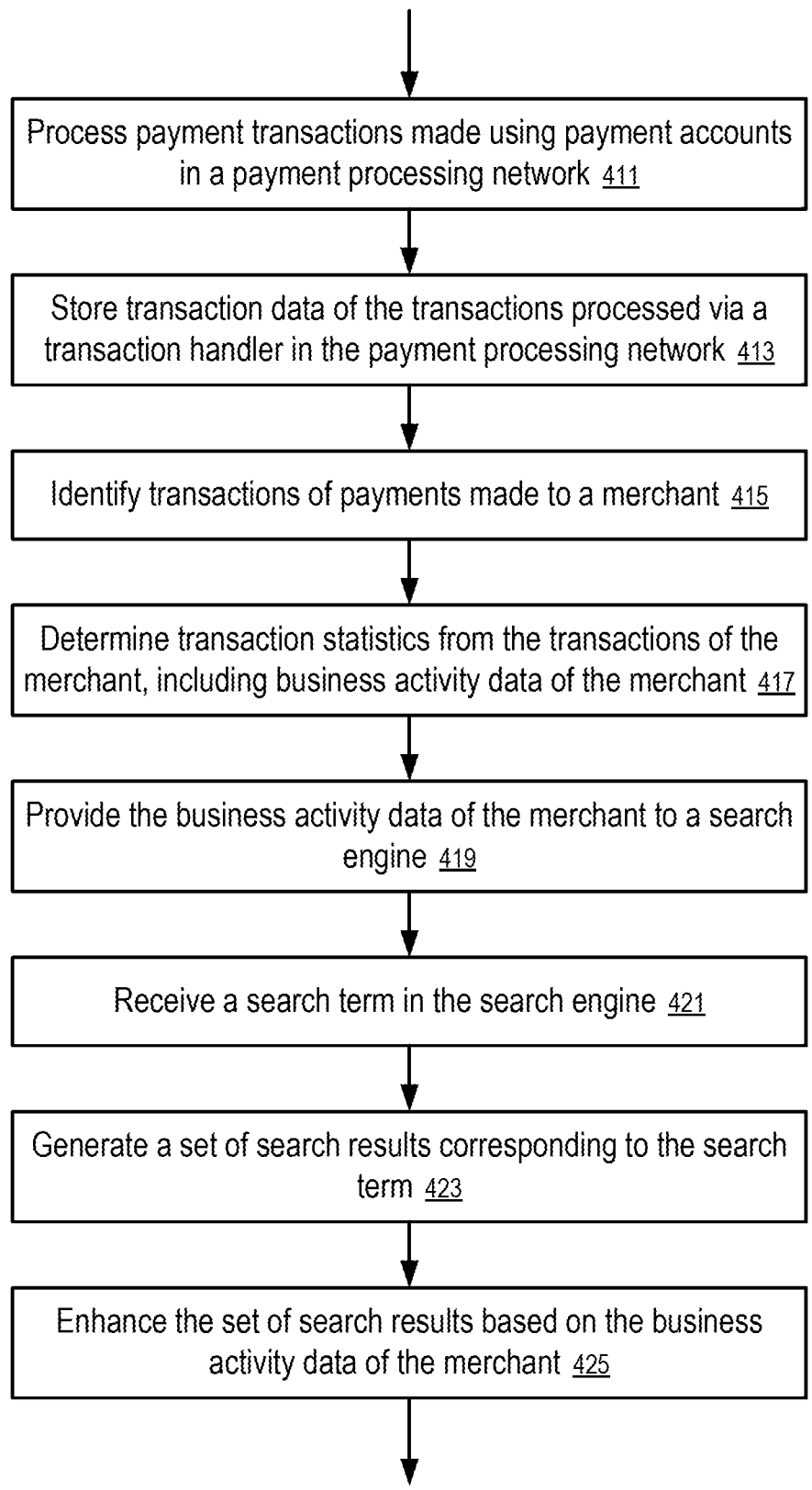
FIG. 13 shows a method to enhance search via transaction data according to one embodiment.

FIG. 13 shows a method to enhance search via transaction data according to one embodiment. In one embodiment, the method of FIG. 13 is implemented in a system illustrated in FIG. 12.

In one embodiment, the transaction handler (103) is configured to process (411) payment transactions made using payment accounts (e.g., consumer account (146) in a payment processing network (e.g., as illustrated in FIG. 4). The data warehouse (149) is configured to store (413) transaction data (109) of the transactions processed via the transaction handler (103) in the payment processing network.

In one embodiment, the profile generator (121) is configured to identify (415) transactions of payments made to a merchant, such as payments from a consumer account (146) to a merchant account (148) of the merchant, where an issuer processor controls the consumer account (146) on behalf of a customer of the merchant, and an acquirer processor (147) controls the merchant account (148) to receive the payments form the customers of the merchant.

In one embodiment, the profile generator (121) determines (417) transaction statistics from the transactions of the merchant, including business activity data (409) of the merchant; and the portal (143) provides (419) the business activity data (409) of the merchant to the search engine (403). The business activity data (409) may be provided to the search engine (403) in response to the request (405) from the search engine (403) identifying the merchant, or periodically in a batch mode.

In FIG. 13, after the search engine (403) receives (421) a search term (401) from the point of interaction (107), the search engine (403) generates (423) a set of search results (407) corresponding to the search term (401), and enhances (425) the set of search results (407) based on the business activity data (409) of the merchant.

For example, the search engine (403) may provide a portion of the business activity data (409) as part of the search result (407) related to the merchant.

For example, the search engine (403) may filter the search result (407) based on business activity data (409) (e.g., eliminating results about inactive merchants, merchants that are not currently open for business, etc.)

For example, the search engine (403) may use the business activity data (409) to select offers that meet the needs of the user who submitted the search term (401). In one embodiment, the needs of the user are inferred from the search term (401). For example, when the search term relates to the products and/or services provided by the merchant, and the business activity data (409) can be used to determine whether the products and/or services are currently available at the time of the search.

For example, the search engine (403) may use the business activity data (409) to prioritize the search result (407). For example, a more active merchant may be ranked higher than a less active merchant.

In one embodiment, a computing apparatus including the profile generator (121) is configured to identify a set of transactions of a merchant that are processed via a transaction handler (103) of a payment processing network to make payments on behalf of users (e.g., 101) to the merchant. The computing apparatus determines transaction statistics of the set of transactions of the merchant, and causes search results (e.g., 407) to be enhanced based on the transaction statistics.

For example, the transaction statistics may include a transaction profile (127) of the merchant, and/or the business activity data (409) of the merchant.

In one embodiment, to cause of the search results to be enhanced based on the transaction statistics, the computing apparatus transmits the business activity data (409) of the merchant to a search engine (403), where the search engine is configured to use the business activity data (409) of the merchant to enhance the search results.

For example, the computing apparatus may use the portal (143) to transmit the business activity data (409) in response to a request (405) received from the search engine (403), where the request (405) from the search engine (403) is generated in response to a search term (401) received by the search engine (407) from a user (101).

For example, the computing apparatus may periodically transmit the business activity data (409) of the merchant to the search engine (403), which stores the updated business activity data (409) of the merchant to enhance search results (407).

For example, the business activity data (409) of the merchant may include times indicative of business hours of the merchant in a business day, which may be presented with the search result relevant to the merchant.

For example, the business activity data (409) of the merchant may include indication of a peak portion of a business time period, which may be used by the search engine (403) to target offers that are configured to invite customers to visit the merchant during off-peak business hours.

For example, the business activity data (409) of the merchant may include an indicator of whether the merchant is currently active in business, which may be used by the search engine (403) to filter out search results related to inactive merchants.

In one embodiment, a non-transitory computer storage medium stores instructions configured to instruct the computing apparatus to perform various operations discussed herein, such as identifying a set of transactions of a merchant, determining transaction statistics of the set of transactions of the merchant, and causing search results to be enhanced based on the transaction statistics.

In one embodiment, the search engine (403) has at least one microprocessor (173) and a memory (167) storing instructions configured to instruct the at least one microprocessor (173) perform the operations, such as receiving business activity data (409) of a merchant from a portal (143) coupled with a data warehouse (149) storing transaction data (109) of transactions processed in a payment processing network, performing a search according to a search term (401) to obtain search results (407), and enhancing the search results (407) using the business activity data (409).

In one embodiment, the search engine (403) is configured via the instructions to use the business activity data (409) of the merchant to enhance the search results (407), in view of the needs of users of the search engine and non-business time periods of the merchant.

In one embodiment, the search engine (403) is configured via the instructions to use the business activity data (409) of the merchant to select offers to be provided to users of the search engine.

In one embodiment, the search engine (403) is configured via the instructions to use the business activity data (409) of the merchant to target offers configured to invite users to visit the merchant at off-peak business time period of the merchant.

In one embodiment, a computing apparatus having the search engine (403) further includes: a data warehouse (149) configured to store the transaction data (109); and a profile generator (127) configured to generate transaction profiles (127) based on the transaction data (109), wherein the transaction profile (127) of the merchant includes the business activity data (409).

In one embodiment, the computing apparatus may further include: a transaction handler (103) of the payment processing network, configured to record the transaction data in the data warehouse (149); and a portal (413), coupled with the data warehouse (149) and configured to provide the business activity data (409) to the search engine (403), such as an indicator of whether the merchant is active or inactive in business, an indicator of whether the merchant has changed business hours, an indicator of whether the merchant is going out of business, etc.

Figure 7:
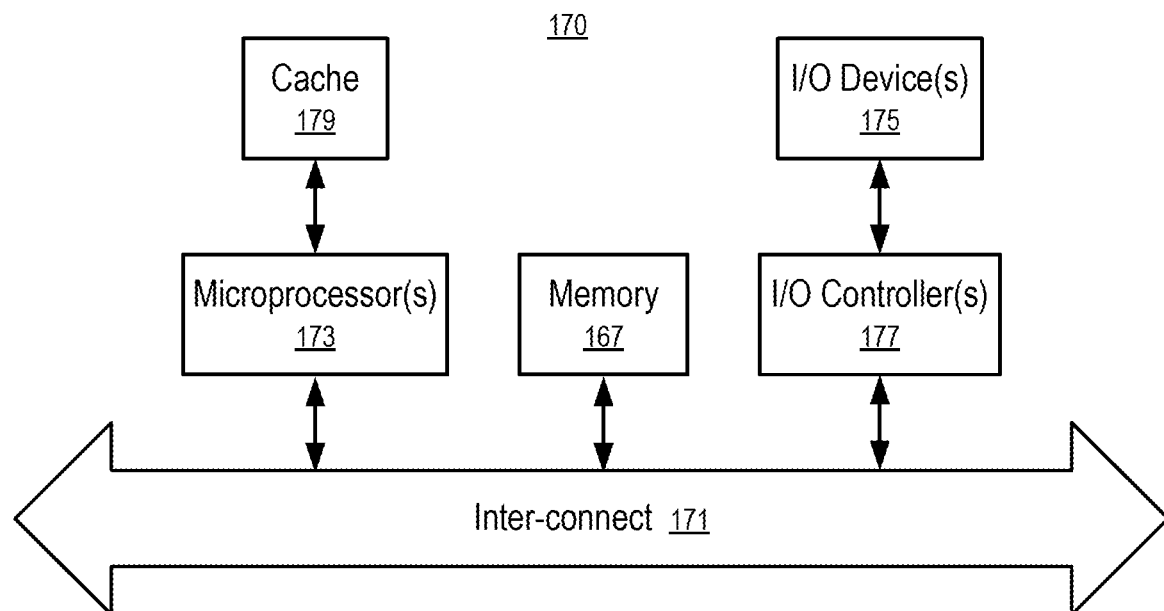
FIG. 7 illustrates a data processing system according to one embodiment.

In one embodiment, a computing apparatus configured to use transaction data to enhance search results includes at least one microprocessor (e.g., 173) and a memory (e.g., 167) storing instructions configured to instruct the microprocessor to perform operations. The computing apparatus includes at least one of: the search engine (403), the portal (143), the transaction handler (103), the data warehouse (149), and the profile generator (121), each of which can be implemented using a data processing system as illustrated in FIG. 7.

Some details about the computing apparatus/system in one embodiment are provided in the sections entitled "CENTRALIZED DATA WAREHOUSE" and "HARDWARE."

Transaction Data Based Services

FIG. 1 illustrates a system to provide services based on transaction data according to one embodiment. In FIG. 1, the system includes a transaction terminal (105) to initiate financial transactions for a user (101), a transaction handler (103) to generate transaction data (109) from processing the financial transactions of the user (101) (and the financial transactions of other users), a profile generator (121) to generate transaction profiles (127) based on the transaction data (109) to provide information/intelligence about user preferences and spending patterns, a point of interaction (107) to provide information and/or offers to the user (101), a user tracker (113) to generate user data (125) to identify the user (101) using the point of interaction (107), a profile selector (129) to select a profile (131) specific to the user (101) identified by the user data (125), and an advertisement selector (133) to select, identify, generate, adjust, prioritize and/or personalize advertisements for presentation to the user (101) on the point of interaction (107) via a media controller (115).

In FIG. 1, the system further includes a correlator (117) to correlate user specific advertisement data (119) with transactions resulting from the user specific advertisement data (119). The correlation results (123) can be used by the profile generator (121) to improve the transaction profiles (127).

Figure 3:
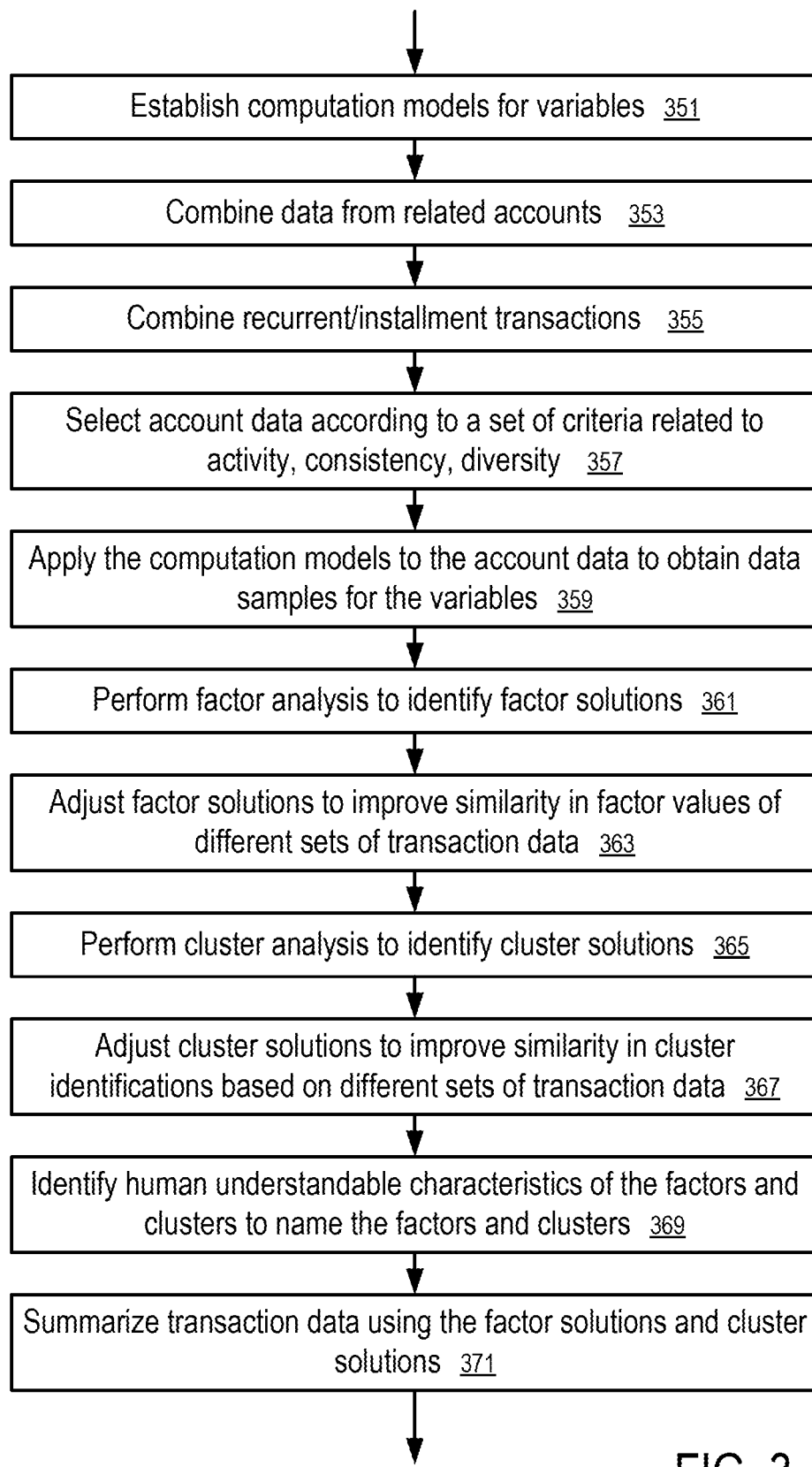
FIG. 3 shows a method to generate an aggregated spending profile according to one embodiment.

The transaction profiles (127) of one embodiment are generated from the transaction data (109) in a way as illustrated in FIGS. 2 and 3. For example, in FIG. 2, an aggregated spending profile (341) is generated via the factor analysis (327) and cluster analysis (329) to summarize (335) the spending patterns/behaviors reflected in the transaction records (301).

In one embodiment, a data warehouse (149) as illustrated in FIG. 4 is coupled with the transaction handler (103) to store the transaction data (109) and other data, such as account data (111), transaction profiles (127) and correlation results (123). In FIG. 4, a portal (143) is coupled with the data warehouse (149) to provide data or information derived from the transaction data (109), in response to a query request from a third party or as an alert or notification message.

In FIG. 4, the transaction handler (103) is coupled between an issuer processor (145) in control of a consumer account (146) and an acquirer processor (147) in control of a merchant account (148). An account identification device (141) is configured to carry the account information (142) that identifies the consumer account (146) with the issuer processor (145) and provide the account information (142) to the transaction terminal (105) of a merchant to initiate a transaction between the user (101) and the merchant.

Figure 5:
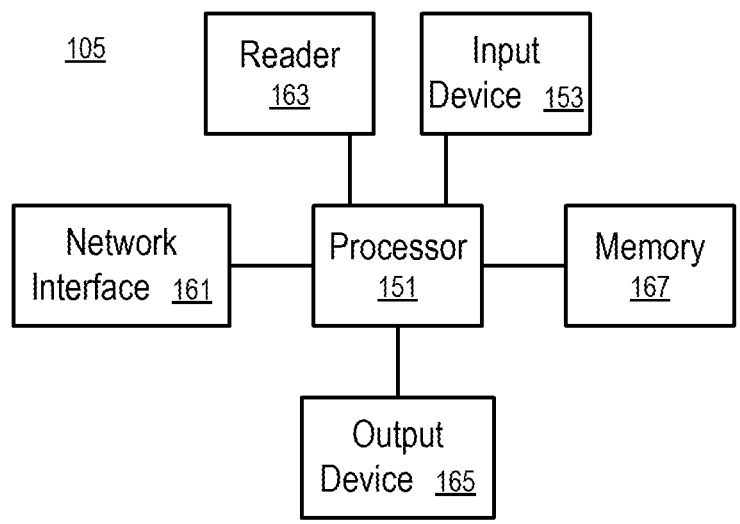
FIG. 5 illustrates a transaction terminal according to one embodiment.
Figure 6:
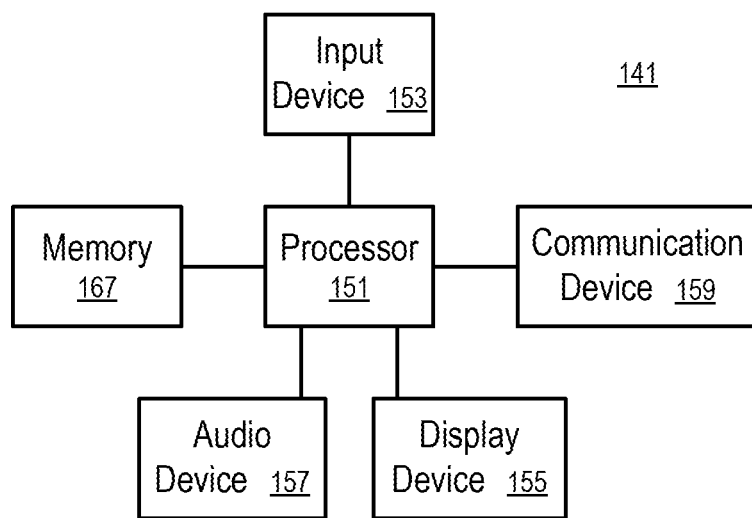
FIG. 6 illustrates an account identifying device according to one embodiment.

FIGS. 5 and 6 illustrate examples of transaction terminals (105) and account identification devices (141). FIG. 7 illustrates the structure of a data processing system (170) that can be used to implement, with more or fewer elements, at least some of the components in the system, such as the point of interaction (107), the transaction handler (103), the portal (143), the data warehouse, the account identification device (141), the transaction terminal (105), the user tracker (113), the profile generator (121), the profile selector (129), the advertisement selector (133), the media controller (115), etc. Some embodiments use more or fewer components than those illustrated, such as, in FIGS. 1, 4-7, and other figures, as further discussed in the section entitled "VARIATIONS."

In one embodiment, the transaction data (109) relates to financial transactions processed by the transaction handler (103); and the account data (111) relates to information about the account holders involved in the transactions. Further data, such as merchant data that relates to the location, business, products and/or services of the merchants that receive payments from account holders for their purchases, can be used in the generation of the transaction profiles (127, 341).

In one embodiment, the financial transactions are made via an account identification device (141), such as financial transaction cards (e.g., credit cards, debit cards, banking cards, etc.); the financial transaction cards may be embodied in various devices, such as plastic cards, chips, radio frequency identification (RFID) devices, mobile phones, personal digital assistants (PDAs), etc.; and the financial transaction cards may be represented by account identifiers (e.g., account numbers or aliases). In one embodiment, the financial transactions are made via directly using the account information (142), without physically presenting the account identification device (141).

Further features, modifications and details are provided in various sections of this description.

Centralized Data Warehouse

In one embodiment, the transaction handler (103) couples with a centralized data warehouse (149) organized around the transaction data (109). For example, the centralized data warehouse (149) may include, and/or support the determination of, spend band distribution, transaction count and amount, merchant categories, merchant by state, cardholder segmentation by velocity scores, and spending within merchant target, competitive set and cross-section. For example, the centralized data warehouse (149) may include the advertisement data (135) and/or offers of benefits such as discount, reward, points, cashback, etc. The offers can be communicated to the users (e.g., 101) via the advertisement data (135) or as part of the advertisement data (135).

In one embodiment, the centralized data warehouse (149) provides centralized management but allows decentralized execution. For example, a third party strategic marketing analyst, statistician, marketer, promoter, business leader, etc., may access the centralized data warehouse (149) to analyze customer and shopper data, to provide follow-up analyses of customer contributions, to develop propensity models for increased conversion of marketing campaigns, to develop segmentation models for marketing, etc. The centralized data warehouse (149) can be used to manage advertisement campaigns and analyze response profitability.

In one embodiment, the centralized data warehouse (149) includes merchant data (e.g., data about sellers), customer/business data (e.g., data about buyers), and transaction records (301) between sellers and buyers over time. The centralized data warehouse (149) can be used to support corporate sales forecasting, fraud analysis reporting, sales/customer relationship management (CRM) business intelligence, credit risk prediction and analysis, advanced authorization reporting, merchant benchmarking, business intelligence for small business, rewards, etc.

In one embodiment, the transaction data (109) is combined with external data, such as surveys, benchmarks, search engine statistics, demographics, competition information, emails, etc., to flag key events and data values, to set customer, merchant, data or event triggers, and to drive new transactions and new customer contacts.

Transaction Profile

In FIG. 1, the profile generator (121) generates transaction profiles (127) based on the transaction data (109), the account data (111), and/or other data, such as non-transactional data, wish lists, merchant provided information, address information, information from social network websites, information from credit bureaus, information from search engines, and other examples discussed in U.S. patent application Ser. No. 12/614,603, filed Nov. 9, 2009, assigned U.S. Pat. App. Pub. No. 2011/0054981, and entitled "Analyzing Local Non-Transactional Data with Transactional Data in Predictive Models," the disclosure of which is hereby incorporated herein by reference.

In one embodiment, the transaction profiles (127) provide intelligence information on the behavior, pattern, preference, propensity, tendency, frequency, trend, and budget of the user (101) in making purchases. In one embodiment, the transaction profiles (127) include information about what the user (101) owns, such as points, miles, or other rewards currency, available credit, and received offers, such as coupons loaded into the accounts of the user (101). In one embodiment, the transaction profiles (127) include information based on past offer/coupon redemption patterns. In one embodiment, the transaction profiles (127) include information on shopping patterns in retail stores as well as online, including frequency of shopping, amount spent in each shopping trip, distance of merchant location (retail) from the address of the account holder(s), etc.

In one embodiment, the transaction handler (103) (and/or the portal (143)) is configured to provide at least part of the intelligence for the prioritization, generation, selection, customization and/or adjustment of the advertisement for delivery within a transaction process involving the transaction handler (103). For example, the advertisement may be presented to a customer in response to the customer making a payment via the transaction handler (103).

Some of the transaction profiles (127) are specific to the user (101), or to an account of the user (101), or to a group of users of which the user (101) is a member, such as a household, family, company, neighborhood, city, or group identified by certain characteristics related to online activities, offline purchase activities, merchant propensity, etc.

The profile generator (121) may generate and update the transaction profiles (127) in batch mode periodically, or generates the transaction profiles (127) in real time, or just in time, in response to a request received in the portal (143) for such profiles.

The transaction profiles (127) of one embodiment include the values for a set of parameters. Computing the values of the parameters may involve counting transactions that meet one or more criteria, and/or building a statistically-based model in which one or more calculated values or transformed values are put into a statistical algorithm that weights each value to optimize its collective predictiveness for various predetermined purposes.

Further details and examples about the transaction profiles (127) in one embodiment are provided in the section entitled "AGGREGATED SPENDING PROFILE."

Non-Transactional Data

In one embodiment, the transaction data (109) is analyzed in connection with non-transactional data to generate transaction profiles (127) and/or to make predictive models.

In one embodiment, transactions are correlated with non-transactional events, such as news, conferences, shows, announcements, market changes, natural disasters, etc. to establish cause and effect relations to predict future transactions or spending patterns. For example, non-transactional data may include the geographic location of a news event, the date of an event from an events calendar, the name of a performer for an upcoming concert, etc. The non-transactional data can be obtained from various sources, such as newspapers, websites, blogs, social networking sites, etc.

When the cause and effect relationships between the transactions and non-transactional events are known (e.g., based on prior research results, domain knowledge, expertise), the relationships can be used in predictive models to predict future transactions or spending patterns, based on events that occurred recently or are happening in real time.

In one embodiment, the non-transactional data relates to events that happened in a geographical area local to the user (101) that performed the respective transactions. In one embodiment, a geographical area is local to the user (101) when the distance from the user (101) to locations in the geographical area is within a convenient range for daily or regular travel, such as 20, 50 or 100 miles from an address of the user (101), or within the same city or zip code area of an address of the user (101). Examples of analyses of local non-transactional data in connection with transaction data (109) in one embodiment are provided in U.S. patent application Ser. No. 12/614,603, filed Nov. 9, 2009, assigned U.S. Pat. App. Pub. No. 2011/0054981, and entitled "Analyzing Local Non-Transactional Data with Transactional Data in Predictive Models," the disclosure of which is hereby incorporated herein by reference.

In one embodiment, the non-transactional data is not limited to local non-transactional data. For example, national non-transactional data can also be used.

In one embodiment, the transaction records (301) are analyzed in frequency domain to identify periodic features in spending events. The periodic features in the past transaction records (301) can be used to predict the probability of a time window in which a similar transaction would occur. For example, the analysis of the transaction data (109) can be used to predict when a next transaction having the periodic feature would occur, with which merchant, the probability of a repeated transaction with a certain amount, the probability of exception, the opportunity to provide an advertisement or offer such as a coupon, etc. In one embodiment, the periodic features are detected through counting the number of occurrences of pairs of transactions that occurred within a set of predetermined time intervals and separating the transaction pairs based on the time intervals. Some examples and techniques for the prediction of future transactions based on the detection of periodic features in one embodiment are provided in U.S. patent application Ser. No. 12/773,770, filed May 4, 2010, assigned U.S. Pat. App. Pub. No. 2010/0280882, and entitled "Frequency-Based Transaction Prediction and Processing," the disclosure of which is hereby incorporated herein by reference.

Techniques and details of predictive modeling in one embodiment are provided in U.S. Pat. Nos. 6,119,103, 6,018,723, 6,658,393, 6,598,030, and 7,227,950, the disclosures of which are hereby incorporated herein by reference.

In one embodiment, offers are based on the point-of-service to offeree distance to allow the user (101) to obtain in-person services. In one embodiment, the offers are selected based on transaction history and shopping patterns in the transaction data (109) and/or the distance between the user (101) and the merchant. In one embodiment, offers are provided in response to a request from the user (101), or in response to a detection of the location of the user (101). Examples and details of at least one embodiment are provided in U.S. patent application Ser. No. 11/767,218, filed Jun. 22, 2007, assigned U.S. Pat. App. Pub. No. 2008/0319843, and entitled "Supply of Requested Offer Based on Point-of Service to Offeree Distance," U.S. patent application Ser. No. 11/755,575, filed May 30, 2007, assigned U.S. Pat. App. Pub. No. 2008/0300973, and entitled "Supply of Requested Offer Based on Offeree Transaction History," U.S. patent application Ser. No. 11/855,042, filed Sep. 13, 2007, assigned U.S. Pat. App. Pub. No. 2009/0076896, and entitled "Merchant Supplied Offer to a Consumer within a Predetermined Distance," U.S. patent application Ser. No. 11/855,069, filed Sep. 13, 2007, assigned U.S. Pat. App. Pub. No. 2009/0076925, and entitled "Offeree Requested Offer Based on Point-of Service to Offeree Distance," and U.S. patent application Ser. No. 12/428,302, filed Apr. 22, 2009, assigned U.S. Pat. App. Pub. No. 2010/0274627, and entitled "Receiving an Announcement Triggered by Location Data," the disclosures of which applications are hereby incorporated herein by reference.

Targeting Advertisement

In FIG. 1, an advertisement selector (133) prioritizes, generates, selects, adjusts, and/or customizes the available advertisement data (135) to provide user specific advertisement data (119) based at least in part on the user specific profile (131). The advertisement selector (133) uses the user specific profile (131) as a filter and/or a set of criteria to generate, identify, select and/or prioritize advertisement data for the user (101). A media controller (115) delivers the user specific advertisement data (119) to the point of interaction (107) for presentation to the user (101) as the targeted and/or personalized advertisement.

In one embodiment, the user data (125) includes the characterization of the context at the point of interaction (107). Thus, the use of the user specific profile (131), selected using the user data (125), includes the consideration of the context at the point of interaction (107) in selecting the user specific advertisement data (119).

In one embodiment, in selecting the user specific advertisement data (119), the advertisement selector (133) uses not only the user specific profile (131), but also information regarding the context at the point of interaction (107). For example, in one embodiment, the user data (125) includes information regarding the context at the point of interaction (107); and the advertisement selector (133) explicitly uses the context information in the generation or selection of the user specific advertisement data (119).

In one embodiment, the advertisement selector (133) may query for specific information regarding the user (101) before providing the user specific advertisement data (119). The queries may be communicated to the operator of the transaction handler (103) and, in particular, to the transaction handler (103) or the profile generator (121). For example, the queries from the advertisement selector (133) may be transmitted and received in accordance with an application programming interface or other query interface of the transaction handler (103), the profile generator (121) or the portal (143) of the transaction handler (103).

In one embodiment, the queries communicated from the advertisement selector (133) may request intelligence information regarding the user (101) at any level of specificity (e.g., segment level, individual level). For example, the queries may include a request for a certain field or type of information in a cardholder's aggregate spending profile (341). As another example, the queries may include a request for the spending level of the user (101) in a certain merchant category over a prior time period (e.g., six months).

In one embodiment, the advertisement selector (133) is operated by an entity that is separate from the entity that operates the transaction handler (103). For example, the advertisement selector (133) may be operated by a search engine, a publisher, an advertiser, an ad network, or an online merchant. The user specific profile (131) is provided to the advertisement selector (133) to assist the customization of the user specific advertisement data (119).

In one embodiment, advertising is targeted based on shopping patterns in a merchant category (e.g., as represented by a Merchant Category Code (MCC)) that has high correlation of spending propensity with other merchant categories (e.g., other MCCs). For example, in the context of a first MCC for a targeted audience, a profile identifying second MCCs that have high correlation of spending propensity with the first MCC can be used to select advertisements for the targeted audience.

In one embodiment, the aggregated spending profile (341) is used to provide intelligence information about the spending patterns, preferences, and/or trends of the user (101). For example, a predictive model can be established based on the aggregated spending profile (341) to estimate the needs of the user (101). For example, the factor values (344) and/or the cluster ID (343) in the aggregated spending profile (341) can be used to determine the spending preferences of the user (101). For example, the channel distribution (345) in the aggregated spending profile (341) can be used to provide a customized offer targeted for a particular channel, based on the spending patterns of the user (101).

In one embodiment, mobile advertisements, such as offers and coupons, are generated and disseminated based on aspects of prior purchases, such as timing, location, and nature of the purchases, etc. In one embodiment, the size of the benefit of the offer or coupon is based on purchase volume or spending amount of the prior purchase and/or the subsequent purchase that may qualify for the redemption of the offer. Further details and examples of one embodiment are provided in U.S. patent application Ser. No. 11/960,162, filed Dec. 19, 2007, assigned U.S. Pat. App. Pub. No. 2008/0201226, and entitled "Mobile Coupon Method and Portable Consumer Device for Utilizing Same," the disclosure of which is hereby incorporated herein by reference.

In one embodiment, conditional rewards are provided to the user (101); and the transaction handler (103) monitors the transactions of the user (101) to identify redeemable rewards that have satisfied the respective conditions. In one embodiment, the conditional rewards are selected based on transaction data (109). Further details and examples of one embodiment are provided in U.S. patent application Ser. No. 11/862,487, filed Sep. 27, 2007, assigned U.S. Pat. App. Pub. No. 2008/0082418, and entitled "Consumer Specific Conditional Rewards," the disclosure of which is hereby incorporated herein by reference. The techniques to detect the satisfied conditions of conditional rewards can also be used to detect the transactions that satisfy the conditions specified to locate the transactions that result from online activities, such as online advertisements, searches, etc., to correlate the transactions with the respective online activities.

Further details about targeted offer delivery in one embodiment are provided in U.S. patent application Ser. No. 12/185,332, filed Aug. 4, 2008, assigned U.S. Pat. App. Pub. No. 2010/0030644, and entitled "Targeted Advertising by Payment Processor History of Cashless Acquired Merchant Transaction on Issued Consumer Account," and in U.S. patent application Ser. No. 12/849,793, filed Aug. 3, 2010, assigned U.S. Pat. App. Pub. No. 2011/0035280, and entitled "Systems and Methods for Targeted Advertisement Delivery," the disclosures of which applications are hereby incorporated herein by reference.

Profile Matching

In FIG. 1, the user tracker (113) obtains and generates context information about the user (101) at the point of interaction (107), including user data (125) that characterizes and/or identifies the user (101). The profile selector (129) selects a user specific profile (131) from the set of transaction profiles (127) generated by the profile generator (121), based on matching the characteristics of the transaction profiles (127) and the characteristics of the user data (125). For example, the user data (125) indicates a set of characteristics of the user (101); and the profile selector (129) selects the user specific profile (131) that is for a particular user or a group of users and that best matches the set of characteristics specified by the user data (125).

In one embodiment, the profile selector (129) receives the transaction profiles (127) in a batch mode. The profile selector (129) selects the user specific profile (131) from the batch of transaction profiles (127) based on the user data (125). Alternatively, the profile generator (121) generates the transaction profiles (127) in real time; and the profile selector (129) uses the user data (125) to query the profile generator (121) to generate the user specific profile (131) in real time, or just in time. The profile generator (121) generates the user specific profile (131) that best matches the user data (125).

In one embodiment, the user tracker (113) identifies the user (101) based on the user activity on the transaction terminal (105) (e.g., having visited a set of websites, currently visiting a type of web pages, search behavior, etc.).

In one embodiment, the user data (125) includes an identifier of the user (101), such as a global unique identifier (GUID), a personal account number (PAN) (e.g., credit card number, debit card number, or other card account number), or other identifiers that uniquely and persistently identify the user (101) within a set of identifiers of the same type. Alternatively, the user data (125) may include other identifiers, such as an Internet Protocol (IP) address of the user (101), a name or user name of the user (101), or a browser cookie ID, which identify the user (101) in a local, temporary, transient and/or anonymous manner. Some of these identifiers of the user (101) may be provided by publishers, advertisers, ad networks, search engines, merchants, or the user tracker (113). In one embodiment, such identifiers are correlated to the user (101) based on the overlapping or proximity of the time period of their usage to establish an identification reference table.

In one embodiment, the identification reference table is used to identify the account information (142) (e.g., account number (302)) based on characteristics of the user (101) captured in the user data (125), such as browser cookie ID, IP addresses, and/or timestamps on the usage of the IP addresses. In one embodiment, the identification reference table is maintained by the operator of the transaction handler (103). Alternatively, the identification reference table is maintained by an entity other than the operator of the transaction handler (103).

In one embodiment, the user tracker (113) determines certain characteristics of the user (101) to describe a type or group of users of which the user (101) is a member. The transaction profile of the group is used as the user specific profile (131). Examples of such characteristics include geographical location or neighborhood, types of online activities, specific online activities, or merchant propensity. In one embodiment, the groups are defined based on aggregate information (e.g., by time of day, or household), or segment (e.g., by cluster, propensity, demographics, cluster IDs, and/or factor values). In one embodiment, the groups are defined in part via one or more social networks. For example, a group may be defined based on social distances to one or more users on a social network website, interactions between users on a social network website, and/or common data in social network profiles of the users in the social network website.

In one embodiment, the user data (125) may match different profiles at a different granularity or resolution (e.g., account, user, family, company, neighborhood, etc.), with different degrees of certainty. The profile selector (129) and/or the profile generator (121) may determine or select the user specific profile (131) with the finest granularity or resolution with acceptable certainty. Thus, the user specific profile (131) is most specific or closely related to the user (101).

In one embodiment, the advertisement selector (133) uses further data in prioritizing, selecting, generating, customizing and adjusting the user specific advertisement data (119). For example, the advertisement selector (133) may use search data in combination with the user specific profile (131) to provide benefits or offers to a user (101) at the point of interaction (107). For example, the user specific profile (131) can be used to personalize the advertisement, such as adjusting the placement of the advertisement relative to other advertisements, adjusting the appearance of the advertisement, etc.

Browser Cookie

In one embodiment, the user data (125) uses browser cookie information to identify the user (101). The browser cookie information is matched to account information (142) or the account number (302) to identify the user specific profile (131), such as aggregated spending profile (341) to present effective, timely, and relevant marketing information to the user (101), via the preferred communication channel (e.g., mobile communications, web, mail, email, POS, etc.) within a window of time that could influence the spending behavior of the user (101). Based on the transaction data (109), the user specific profile (131) can improve audience targeting for online advertising. Thus, customers will get better advertisements and offers presented to them; and the advertisers will achieve better return-on-investment for their advertisement campaigns.

In one embodiment, the browser cookie that identifies the user (101) in online activities, such as web browsing, online searching, and using social networking applications, can be matched to an identifier of the user (101) in account data (111), such as the account number (302) of a financial payment card of the user (101) or the account information (142) of the account identification device (141) of the user (101). In one embodiment, the identifier of the user (101) can be uniquely identified via matching IP address, timestamp, cookie ID and/or other user data (125) observed by the user tracker (113).

In one embodiment, a look up table is used to map browser cookie information (e.g., IP address, timestamp, cookie ID) to the account data (111) that identifies the user (101) in the transaction handler (103). The look up table may be established via correlating overlapping or common portions of the user data (125) observed by different entities or different user trackers (113).

In one embodiment, the portal (143) is configured to identify the consumer account (146) based on the IP address identified in the user data (125) through mapping the IP address to a street address.

In one embodiment, the portal (143) uses a plurality of methods to identify consumer accounts (146) based on the user data (125). The portal (143) combines the results from the different methods to determine the most likely consumer account (146) for the user data (125).

Details about the identification of consumer account (146) based on user data (125) in one embodiment are provided in U.S. patent application Ser. No. 12/849,798, filed Aug. 3, 2010, assigned U.S. Pat. App. Pub. No. 2011/0093327, and entitled "Systems and Methods to Match Identifiers," the disclosure of which is hereby incorporated herein by reference.

Close the Loop

In one embodiment, the correlator (117) is used to "close the loop" for the tracking of consumer behavior across an on-line activity and an "off-line" activity that results at least in part from the on-line activity. In one embodiment, online activities, such as searching, web browsing, social networking, and/or consuming online advertisements, are correlated with respective transactions to generate the correlation result (123) in FIG. 1. The respective transactions may occur offline, in "brick and mortar" retail stores, or online but in a context outside the online activities, such as a credit card purchase that is performed in a way not visible to a search company that facilitates the search activities.

The correlator (117) is configured in one embodiment to identify transactions resulting from searches or online advertisements. For example, in response to a query about the user (101) from the user tracker (113), the correlator (117) identifies an offline transaction performed by the user (101) and sends the correlation result (123) about the offline transaction to the user tracker (113), which allows the user tracker (113) to combine the information about the offline transaction and the online activities to provide significant marketing advantages.

For example, a marketing department could correlate an advertising budget to actual sales. For example, a marketer can use the correlation result (123) to study the effect of certain prioritization strategies, customization schemes, etc. on the impact on the actual sales. For example, the correlation result (123) can be used to adjust or prioritize advertisement placement on a web site, a search engine, a social networking site, an online marketplace, or the like.

In one embodiment, the profile generator (121) uses the correlation result (123) to augment the transaction profiles (127) with data indicating the rate of conversion from searches or advertisements to purchase transactions. In one embodiment, the correlation result (123) is used to generate predictive models to determine what a user (101) is likely to purchase when the user (101) is searching using certain keywords or when the user (101) is presented with an advertisement or offer. In one embodiment, the portal (143) is configured to report the correlation result (123) to a partner, such as a search engine, a publisher, or a merchant, to allow the partner to use the correlation result (123) to measure the effectiveness of advertisements and/or search result customization, to arrange rewards, etc.

In one embodiment, the correlator (117) matches the online activities and the transactions based on matching the user data (125) provided by the user tracker (113) and the records of the transactions, such as transaction data (109) or transaction records (301). In another embodiment, the correlator (117) matches the online activities and the transactions based on the redemption of offers/benefits provided in the user specific advertisement data (119).

In one embodiment, the portal (143) is configured to receive a set of conditions and an identification of the user (101), determine whether there is any transaction of the user (101) that satisfies the set of conditions, and if so, provide indications of the transactions that satisfy the conditions and/or certain details about the transactions, which allows the requester to correlate the transactions with certain user activities, such as searching, web browsing, consuming advertisements, etc.

In one embodiment, the requester may not know the account number (302) of the user (101); and the portal (143) is to map the identifier provided in the request to the account number (302) of the user (101) to provide the requested information. Examples of the identifier being provided in the request to identify the user (101) include an identification of an iFrame of a web page visited by the user (101), a browser cookie ID, an IP address and the day and time corresponding to the use of the IP address, etc.

The information provided by the portal (143) can be used in pre-purchase marketing activities, such as customizing content or offers, prioritizing content or offers, selecting content or offers, etc., based on the spending pattern of the user (101). The content that is customized, prioritized, selected, or recommended may be the search results, blog entries, items for sale, etc.

The information provided by the portal (143) can be used in post-purchase activities. For example, the information can be used to correlate an offline purchase with online activities. For example, the information can be used to determine purchases made in response to media events, such as television programs, advertisements, news announcements, etc.

Details about profile delivery, online activity to offline purchase tracking, techniques to identify the user specific profile (131) based on user data (125) (such as IP addresses), and targeted delivery of advertisement/offer/benefit in some embodiments are provided in U.S. patent application Ser. No. 12/849,789, filed Aug. 3, 2010, assigned U.S. Pat. App. Pub. No. 2011/0035278, and entitled "Systems and Methods for Closing the Loop between Online Activities and Offline Purchases," the disclosure of which application is incorporated herein by reference.

Loyalty Program

In one embodiment, the transaction handler (103) uses the account data (111) to store information for third party loyalty programs.

Figure 8:
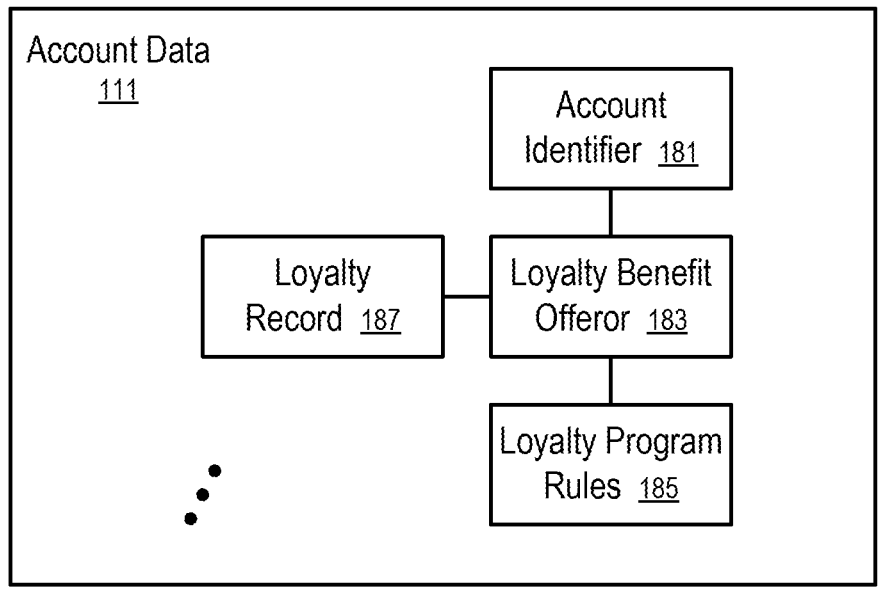
FIG. 8 shows the structure of account data for providing loyalty programs according to one embodiment.

FIG. 8 shows the structure of account data (111) for providing loyalty programs according to one embodiment. In FIG. 8, data related to a third party loyalty program may include an identifier of the loyalty benefit offeror (183) that is linked to a set of loyalty program rules (185) and loyalty record (187) for the loyalty program activities of the account identifier (181). In one embodiment, at least part of the data related to the third party loyalty program is stored under the account identifier (181) of the user (101), such as the loyalty record (187).

FIG. 8 illustrates the data related to one third party loyalty program of a loyalty benefit offeror (183). In one embodiment, the account identifier (181) may be linked to multiple loyalty benefit offerors (e.g., 183), corresponding to different third party loyalty programs. The third party loyalty program of the loyalty benefit offeror (183) provides the user (101), identified by the account identifier (181), with benefits, such as discounts, rewards, incentives, cash back, gifts, coupons, and/or privileges.

In one embodiment, the association between the account identifier (181) and the loyalty benefit offeror (183) in the account data (111) indicates that the user (101) having the account identifier (181) is a member of the loyalty program. Thus, the user (101) may use the account identifier (181) to access privileges afforded to the members of the loyalty programs, such as rights to access a member only area, facility, store, product or service, discounts extended only to members, or opportunities to participate in certain events, buy certain items, or receive certain services reserved for members.

In one embodiment, it is not necessary to make a purchase to use the privileges. The user (101) may enjoy the privileges based on the status of being a member of the loyalty program. The user (101) may use the account identifier (181) to show the status of being a member of the loyalty program.

For example, the user (101) may provide the account identifier (181) (e.g., the account number of a credit card) to the transaction terminal (105) to initiate an authorization process for a special transaction which is designed to check the member status of the user (101), as if the account identifier (181) were used to initiate an authorization process for a payment transaction. The special transaction is designed to verify the member status of the user (101) via checking whether the account data (111) is associated with the loyalty benefit offeror (183). If the account identifier (181) is associated with the corresponding loyalty benefit offeror (183), the transaction handler (103) provides an approval indication in the authorization process to indicate that the user (101) is a member of the loyalty program. The approval indication can be used as a form of identification to allow the user (101) to access member privileges, such as access to services, products, opportunities, facilities, discounts, permissions, which are reserved for members.

In one embodiment, when the account identifier (181) is used to identify the user (101) as a member to access member privileges, the transaction handler (103) stores information about the access of the corresponding member privilege in loyalty record (187). The profile generator (121) may use the information accumulated in the loyalty record (187) to enhance transaction profiles (127) and provide the user (101) with personalized/targeted advertisements, with or without further offers of benefit (e.g., discounts, incentives, rebates, cash back, rewards, etc.).

In one embodiment, the association of the account identifier (181) and the loyalty benefit offeror (183) also allows the loyalty benefit offeror (183) to access at least a portion of the account data (111) relevant to the loyalty program, such as the loyalty record (187) and certain information about the user (101), such as name, address, and other demographic data.

In one embodiment, the loyalty program allows the user (101) to accumulate benefits according to loyalty program rules (185), such as reward points, cash back, levels of discounts, etc. For example, the user (101) may accumulate reward points for transactions that satisfy the loyalty program rules (185); and the user (101) may use the reward points to redeem cash, gift, discounts, etc. In one embodiment, the loyalty record (187) stores the accumulated benefits; and the transaction handler (103) updates the loyalty record (187) associated with the loyalty benefit offeror (183) and the account identifier (181), when events that satisfy the loyalty program rules occur.

In one embodiment, the accumulated benefits as indicated in the loyalty record (187) can be redeemed when the account identifier (181) is used to perform a payment transaction, when the payment transaction satisfies the loyalty program rules. For example, the user (101) may redeem a number of points to offset or reduce an amount of the purchase price.

In one embodiment, when the user (101) uses the account identifier (181) to make purchases as a member, the merchant may further provide information about the purchases; and the transaction handler (103) can store the information about the purchases as part of the loyalty record (187). The information about the purchases may identify specific items or services purchased by the member. For example, the merchant may provide the transaction handler (103) with purchase details at stock-keeping unit (SKU) level, which are then stored as part of the loyalty record (187). The loyalty benefit offeror (183) may use the purchase details to study the purchase behavior of the user (101); and the profile generator (121) may use the SKU level purchase details to enhance the transaction profiles (127).

Figure 9:
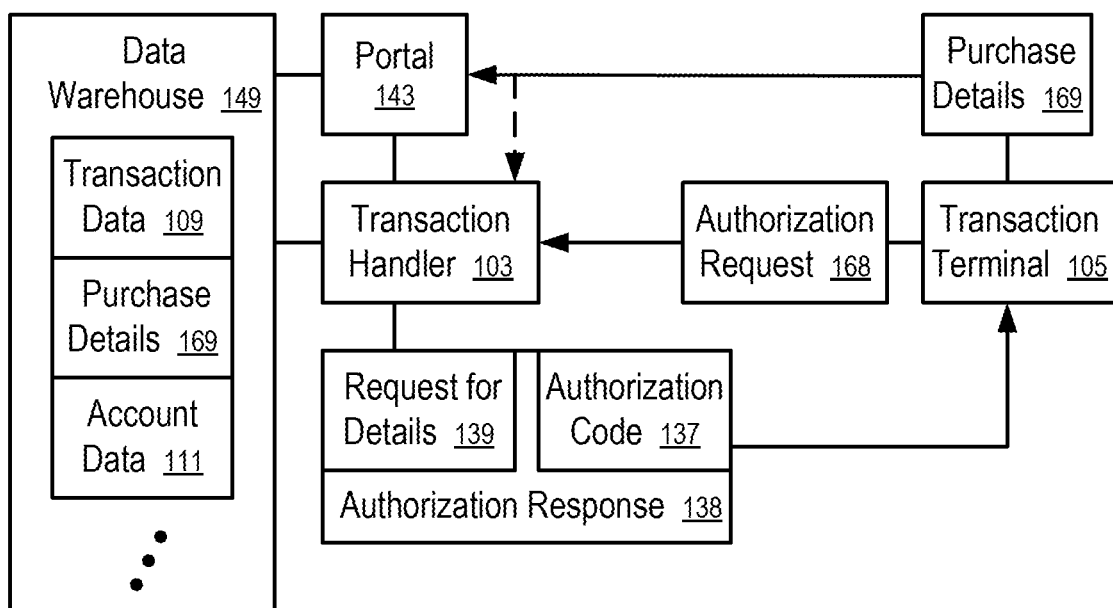
FIG. 9 shows a system to obtain purchase details according to one embodiment.

In one embodiment, the SKU level purchase details are requested from the merchants or retailers via authorization responses (e.g., as illustrated in FIG. 9), when the account (146) of the user (101) is enrolled in a loyalty program that allows the transaction handler (103) (and/or the issuer processor (145)) to collect the purchase details.

A method to provide loyalty programs of one embodiment includes the use of the transaction handler (103) as part of a computing apparatus. The computing apparatus processes a plurality of payment card transactions. After the computing apparatus receives a request to track transactions for a loyalty program, such as the loyalty program rules (185), the computing apparatus stores and updates loyalty program information in response to transactions occurring in the loyalty program. The computing apparatus provides to a customer (e.g., 101) an offer of a benefit when the customer satisfies a condition defined in the loyalty program, such as the loyalty program rules (185). In one embodiment, the loyalty benefit as identified in the loyalty record (187) can be redeemed in connection with a transaction in a way the benefit of an offer stored in association with the account identifier (181) is redeemed.

Examples of loyalty programs through collaboration between collaborative constituents in a payment processing system, including the transaction handler (103) in one embodiment are provided in U.S. patent application Ser. No. 11/767,202, filed Jun. 22, 2007, assigned U.S. Pat. App. Pub. No. 2008/0059302, and entitled "Loyalty Program Service," U.S. patent application Ser. No. 11/848,112, filed Aug. 30, 2007, assigned U.S. Pat. App. Pub. No. 2008/0059306, and entitled "Loyalty Program Incentive Determination," and U.S. patent application Ser. No. 11/848,179, filed Aug. 30, 2007, assigned U.S. Pat. App. Pub. No. 2008/0059307, and entitled "Loyalty Program Parameter Collaboration," the disclosures of which applications are hereby incorporated herein by reference.

Examples of processing the redemption of accumulated loyalty benefits via the transaction handler (103) in one embodiment are provided in U.S. patent application Ser. No. 11/835,100, filed Aug. 7, 2007, assigned U.S. Pat. App. Pub. No. 2008/0059303, and entitled "Transaction Evaluation for Providing Rewards," the disclosure of which is hereby incorporated herein by reference.

In one embodiment, the incentive, reward, or benefit provided in the loyalty program is based on the presence of correlated related transactions. For example, in one embodiment, an incentive is provided if a financial payment card is used in a reservation system to make a reservation and the financial payment card is subsequently used to pay for the reserved good or service. Further details and examples of one embodiment are provided in U.S. patent application Ser. No. 11/945,907, filed Nov. 27, 2007, assigned U.S. Pat. App. Pub. No. 2008/0071587, and entitled "Incentive Wireless Communication Reservation," the disclosure of which is hereby incorporated herein by reference.

In one embodiment, the transaction handler (103) provides centralized loyalty program management, reporting and membership services. In one embodiment, membership data is downloaded from the transaction handler (103) to acceptance point devices, such as the transaction terminal (105). In one embodiment, loyalty transactions are reported from the acceptance point devices to the transaction handler (103); and the data indicating the loyalty points, rewards, benefits, etc. are stored on the account identification device (141). Further details and examples of one embodiment are provided in U.S. patent application Ser. No. 10/401,504, filed Mar. 27, 2003, assigned U.S. Pat. App. Pub. No. 2004/0054581, and entitled "Network Centric Loyalty System," the disclosure of which is hereby incorporated herein by reference.

In one embodiment, the portal (143) of the transaction handler (103) is used to manage reward or loyalty programs for entities such as issuers, merchants, etc. The cardholders, such as the user (101), are rewarded with offers/benefits from merchants. The portal (143) and/or the transaction handler (103) track the transaction records for the merchants for the reward or loyalty programs. Further details and examples of one embodiment are provided in U.S. patent application Ser. No. 11/688,423, filed Mar. 20, 2007, assigned U.S. Pat. App. Pub. No. 2008/0195473, and entitled "Reward Program Manager," the disclosure of which is hereby incorporated herein by reference.

In one embodiment, a loyalty program includes multiple entities providing access to detailed transaction data, which allows the flexibility for the customization of the loyalty program. For example, issuers or merchants may sponsor the loyalty program to provide rewards; and the portal (143) and/or the transaction handler (103) stores the loyalty currency in the data warehouse (149). Further details and examples of one embodiment are provided in U.S. patent application Ser. No. 12/177,530, filed Jul. 22, 2008, assigned U.S. Pat. App. Pub. No. 2009/0030793, and entitled "Multi-Vender Multi-Loyalty Currency Program," the disclosure of which is hereby incorporated herein by reference.

In one embodiment, an incentive program is created on the portal (143) of the transaction handler (103). The portal (143) collects offers from a plurality of merchants and stores the offers in the data warehouse (149). The offers may have associated criteria for their distributions. The portal (143) and/or the transaction handler (103) may recommend offers based on the transaction data (109). In one embodiment, the transaction handler (103) automatically applies the benefits of the offers during the processing of the transactions when the transactions satisfy the conditions associated with the offers. In one embodiment, the transaction handler (103) communicates with transaction terminals (105) to set up, customize, and/or update offers based on market focus, product categories, service categories, targeted consumer demographics, etc. Further details and examples of one embodiment are provided in U.S. patent application Ser. No. 12/413,097, filed Mar. 27, 2009, assigned U.S. Pat. App. Pub. No. 2010/0049620, and entitled "Merchant Device Support of an Integrated Offer Network," the disclosure of which is hereby incorporated herein by reference.

In one embodiment, the transaction handler (103) is configured to provide offers from merchants to the user (101) via the payment system, making accessing and redeeming the offers convenient for the user (101). The offers may be triggered by and/or tailored to a previous transaction, and may be valid only for a limited period of time starting from the date of the previous transaction. If the transaction handler (103) determines that a subsequent transaction processed by the transaction handler (103) meets the conditions for the redemption of an offer, the transaction handler (103) may credit the consumer account (146) for the redemption of the offer and/or provide a notification message to the user (101). Further details and examples of one embodiment are provided in U.S. patent application Ser. No. 12/566,350, filed Sep. 24, 2009, assigned U.S. Pat. App. Pub. No. 2010/0114686, and entitled "Real-Time Statement Credits and Notifications," the disclosure of which is hereby incorporated herein by reference.

Details on loyalty programs in one embodiment are provided in U.S. patent application Ser. No. 12/896,632, filed Oct. 1, 2010, assigned U.S. Pat. App. Pub. No. 2011/0087530, and entitled "Systems and Methods to Provide Loyalty Programs," the disclosure of which is hereby incorporated herein by reference.

SKU

In one embodiment, merchants generate stock-keeping unit (SKU) or other specific information that identifies the particular goods and services purchased by the user (101) or customer. The SKU information may be provided to the operator of the transaction handler (103) that processed the purchases. The operator of the transaction handler (103) may store the SKU information as part of transaction data (109), and reflect the SKU information for a particular transaction in a transaction profile (127 or 131) associated with the person involved in the transaction.

When a user (101) shops at a traditional retail store or browses a website of an online merchant, an SKU-level profile associated specifically with the user (101) may be provided to select an advertisement appropriately targeted to the user (101) (e.g., via mobile phones, POS terminals, web browsers, etc.). The SKU-level profile for the user (101) may include an identification of the goods and services historically purchased by the user (101). In addition, the SKU-level profile for the user (101) may identify goods and services that the user (101) may purchase in the future. The identification may be based on historical purchases reflected in SKU-level profiles of other individuals or groups that are determined to be similar to the user (101). Accordingly, the return on investment for advertisers and merchants can be greatly improved.

In one embodiment, the user specific profile (131) is an aggregated spending profile (341) that is generated using the SKU-level information. For example, in one embodiment, the factor values (344) correspond to factor definitions (331) that are generated based on aggregating spending in different categories of products and/or services. A typical merchant offers products and/or services in many different categories.

In one embodiment, the SKU level purchase details are requested from the merchants or retailers via authorization responses (e.g., as illustrated in FIG. 9), when the account (146) of the user (101) is enrolled in a program that allows the transaction handler (103) (and/or the issuer processor (145)) to collect the purchase details. Based on the SKU information and perhaps other transaction data, the profile generator (121) may create an SKU-level transaction profile for the user (101). In one embodiment, based on the SKU information associated with the transactions for each person entering into transactions with the operator of the transaction handler (103), the profile generator (121) may create an SKU-level transaction profile for each person.

Details on SKU-level profile in one embodiment are provided in U.S. patent application Ser. No. 12/899,144, filed Oct. 6, 2010, assigned U.S. Pat. App. Pub. No. 2011/0093335, and entitled "Systems and Methods for Advertising Services Based on an SKU-Level Profile," the disclosure of which is hereby incorporated herein by reference.

Purchase Details

In one embodiment, the transaction handler (103) is configured to selectively request purchase details via authorization responses. When the transaction handler (103) (and/or the issuer processor (145)) needs purchase details, such as identification of specific items purchased and/or their prices, the authorization responses transmitted from the transaction handler (103) is to include an indicator to request for the purchase details for the transaction that is being authorized. The merchants are to determine whether or not to submit purchase details based on whether or not there is a demand indicated in the authorization responses from the transaction handler (103).

FIG. 9 shows a system to obtain purchase details according to one embodiment. In FIG. 9, when the user (101) uses the consumer account (146) to make a payment for a purchase, the transaction terminal (105) of the merchant or retailer sends an authorization request (168) to the transaction handler (103). In response, an authorization response (138) is transmitted from the transaction handler (103) to the transaction terminal (105) to inform the merchant or retailer of the decision to approve or reject the payment request, as decided by the issuer processor (145) and/or the transaction handler (103). The authorization response (138) typically includes an authorization code (137) to identify the transaction and/or to signal that the transaction is approved.

In one embodiment, when the transaction is approved and there is a need for purchase details (169), the transaction handler (103) (or the issuer processor (145)) is to provide an indicator of the request (139) for purchase details in the authorization response (138). The optional request (139) allows the transaction handler (103) (and/or the issuer processor (145)) to request purchase details (169) from the merchant or retailer on demand. When the request (139) for purchase details is present in the authorization response (138), the transaction terminal (105) is to provide the purchase details (169) associated with the payment transaction to the transaction handler (103) directly or indirectly via the portal (143). When the request (139) is absent from the authorization response (138), the transaction terminal (105) does not have to provide the purchase details (169) for the payment transaction.

In one embodiment, prior to transmitting the authorization response (138), the transaction handler (103) (and/or the issuer processor (145)) determines whether there is a need for transaction details. When there is no need for the purchase details (169) for a payment transaction, the request (139) for purchase details (169) is not provided in the authorization response (138) for the payment transaction. When there is a need for the purchase details (169) for a payment transaction, the request (139) for purchase details is provided in the authorization response (138) for the payment transaction. The merchants or retailers do not have to send detailed purchase data to the transaction handler (103) when the authorization response message does not explicitly request detailed purchase data.

Thus, the transaction handler (103) (or the issuer processor (145)) does not have to require all merchants or retailers to send the detailed purchase data (e.g., SKU level purchase details) for all payment transactions processed by the transaction handler (103) (or the issuer processor (145)).

For example, when the consumer account (146) of the user (103) has collected a manufacturer coupon for a product or service that may be sold by the merchant or retailer operating the transaction terminal (105), the transaction handler (103) is to request the purchase details (169) via the authorization response (138) in one embodiment. If the purchase details (169) show that the conditions for the redemption of the manufacturer coupon are satisfied, the transaction handler (103) is to provide the benefit of the manufacturer coupon to the user (101) via credits to the statement for the consumer account (146). This automation of the fulfillment of manufacturer coupon releases the merchant/retailer from the work and complexities in processing manufacturer offers and improves user experiences. Further, retailers and manufacturers are provided with a new consumer promotion distribution channel through the transaction handler (103), which can target the offers based on the transaction profiles (127) of the user (101) and/or the transaction data (109). In one embodiment, the transaction handler (103) can use the offer for loyalty/reward programs.

In another example, if the user (101) is enrolled in a program to request the transaction handler (103) to track and manage purchase details (169) for the user (103), the transaction handler (103) is to request the transaction details (169) via the authorization response (138).

In one embodiment, a message for the authorization response (138) is configured to include a field to indicate whether purchase details are requested for the transaction.

In one embodiment, the authorization response message includes a field to indicate whether the account (146) of the user (101) is a participant of a coupon redemption network. When the field indicates that the account (146) of the user (101) is a participant of a coupon redemption network, the merchant or retailer is to submit the purchase details (169) for the payment made using the account (146) of the user (101).

In one embodiment, when the request (139) for the purchase details (169) is present in the authorization response (138), the transaction terminal (105) of the merchant or retailer is to store the purchase details (169) with the authorization information provided in the authorization response (138). When the transaction is submitted to the transaction handler (103) for settlement, the purchase details (169) are also submitted with the request for settlement.

In one embodiment, the purchase details (169) are transmitted to the transaction handler (103) via a communication channel separate from the communication channel used for the authorization and/or settlement requests for the transaction. For example, the merchant or the retailer may report the purchase details to the transaction handler (103) via a portal (143) of the transaction handler (103). In one embodiment, the report includes an identification of the transaction (e.g., an authorization code (137) for the payment transaction) and the purchase details (e.g., SKU number, Universal Product Code (UPC)).

In one embodiment, the portal (143) of the transaction handler (103) may further communicate with the merchant or the retailer to reduce the amount of purchase detail data to be transmitted the transaction handler (103). For example, in one embodiment, the transaction handler (103) provides an indication of categories of services or products for which the purchase details (169) are requested; and the merchant or retailer is to report only the items that are in these categories. In one embodiment, the portal (143) of the transaction handler (103) is to ask the merchant or the retailer to indicate whether the purchased items include a set of items required for the redemption of the offers.

In one embodiment, the merchant or retailer is to complete the purchase based upon the indication of approval provided in the authorization response (138). When the indicator (e.g., 139) is present in the authorization response (138), the merchant (e.g. inventory management system or the transaction terminal (105)) is to capture and retain the purchase details (169) in an electronic data file. The purchase details (169) include the identification of the individual items purchased (e.g., SKU and/or UPC), their prices, and/or brief descriptions of the items.

In one embodiment, the merchant or retailer is to send the transaction purchase data file to the transaction handler (103) (or the issuer processor (145)) at the end of the day, or according to some other prearranged schedule. In one embodiment, the data file for purchase details (169) is transmitted together with the request to settle the transaction approved via the authorization response (138). In one embodiment, the data file for purchase details (169) is transmitted separately from the request to settle the transaction approved via the authorization response (138).

The purchase details can be used in offer fulfillment. Details and examples of offer fulfillment of one embodiment are provided in U.S. patent application Ser. No. 13/113,710, filed May 23, 2011, assigned U.S. Pat. App. Pub. No. 2011/0288918, and entitled "Systems and Methods for Redemption of Offers," the disclosure of which is hereby incorporated herein by reference.

Local Service

Figure 10:
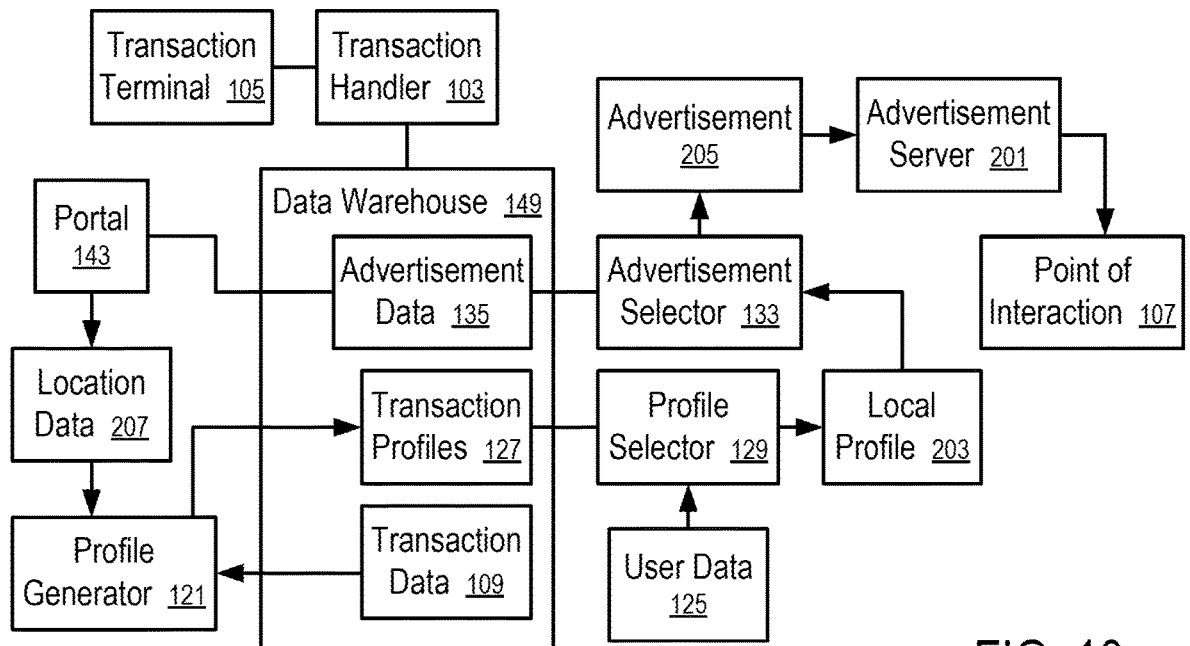
FIG. 10 shows a system to target advertisements based on a local profile according to one embodiment.

FIG. 10 shows a system to target advertisements based on a local profile according to one embodiment. In FIG. 10, the data warehouse (149) is coupled to the transaction handler (103) and the portal (143).

In one embodiment, the transaction handler (103) communicates with the transaction terminal (105) (and/or other transaction terminals) to process payment transactions. The data warehouse (149) stores the transaction data (109) recording the payment transactions processed by the transaction handler (103).

In FIG. 10, the portal (143) is to receive advertisement data (135) from various merchants. A merchant is to identify to the portal (143) the geographical area in which the merchant offers products and/or services. In one embodiment, the location data (207) identifies the geographical area and is part of the advertisement data (135). In one embodiment, a set of geographical areas is pre-defined using the location data (207); and the geographical area serviced by the merchant is to be selected from the pre-defined set.

In FIG. 10, the profile generator (121) is to use the location data (207) to identify a subset of the transaction data (109) in a local geographical area and to generate a local profile (e.g., 203) based on the subset of the transaction data (109). The transaction profiles (127) stored in the data warehouse (149) includes local profiles (e.g., 203) computed for various geographical areas. In one embodiment, the transaction profile (127) is updated periodically (e.g., once a month, six months, or a year) using the recently recorded portion of the transaction data (109).

In one embodiment, the local profile (203) is generated based on aggregating the transactions of a set of merchants that provide services in the geographical area, such as the retail transactions occurring within the geographical area. Such transactions may include the transactions of consumers who do not reside in the geographical area. The set of merchants may include all merchants in the geographical area, or a subset of the merchants in the geographical area that are in a particular merchant group.

In one embodiment, the local profile (203) is generated based on aggregating the transactions of a set of consumers residing in the geographical area. Such transactions may include the transactions of the consumers that were made outside the geographical area, such as purchases made by the consumers while traveling outside the geographical area.

In one embodiment, the local profile (203) is generated based on aggregating the transactions between a set of consumers residing in the geographical area and a set of merchants having retail locations in the geographical area. Such transactions may include the transactions of the consumers at retail locations of the merchants outside the geographical area.

In one embodiment, the local profile (203) is generated based on aggregating the transactions of a set of consumers residing in the geographical area and making the corresponding purchases in the geographical area.

In one embodiment, the local profile (203) is based on the transactions of a particular customer at a plurality of merchants in the geographical area (e.g., not the transactions of other customers).

In one embodiment, the local profile (203) is based on the transactions of a particular merchant with customers residing in the geographical area (e.g., not the transactions of other merchants).

In one embodiment, the portal (143) is to use the local profile (203) to create an advertisement campaign to deliver advertisements of a merchant via one or more media controllers (115), such as a search engine, an online marketplace, a blog, a social networking website, a radio station, a television program, a newspaper, etc. In one embodiment, the local profile (203) is based on transactions of the merchant and/or the transactions of other merchants in a same business category of the merchant.

In one embodiment, the portal (143) is to provide the local profile (203) to a media controller (115) or an advertisement selector (133) for the selection of advertisements targeting the geographical area. For example, when the location data (207) is received from the media controller (115) (or the advertisement selector (133)) in a query for transaction based intelligence information local to the geographical area, the portal (143) is to identify/generate the local profile (203) and provide the local profile (203) to the media controller (115) (or the advertisement selector (133)).

In one embodiment, the portal (143) is to receive the user data (125) that indicates the geographical area corresponding to the local profile (203). The profile selector (129) is to select the local profile (203) from the transaction profiles (127) stored in the data warehouse (149) and provide the local profile (203) to the advertisement selector (133). The advertisement selector (133) is to identify, select, adjust, customize, and personalize the advertisement (205) using the local profile (203).

In one embodiment, the advertisement (205) is provided to the point of interaction (107) via the advertisement server (201). Details of the point of interaction (107) in one embodiment are provided in the section entitled "POINT OF INTERACTION."

In one embodiment, the local profile (203) is provided via the portal (143). In one embodiment, the advertisement (205) is selected from the advertisement data (135) and provided via the portal (143). In one embodiment, a set of transaction profiles (127) is provided by the portal (143) in a batch operation to allow a third party, such as a publisher, to select the local profile (203) based on the user data (125).

In one embodiment, the local profile (203) is generated in real time to response to a request received in the portal (143) from the advertisement selector (133) or from the media controller (115).

In one embodiment, the transaction profiles (127) include local profiles that are generated from collated and aggregated transaction data (109) associated with a local geographical area. The local geographical area may be any level of geographical or political division. For example, the local geographical area may be a community, an area, a town, a city, a county, a state, a country, a nation, etc.

In one embodiment, the local profile (203) is based on a combination of transaction data (109) associated with the local geographical area. The transaction data (109) associated with the local geographical area may include information relating in various ways to, for example, local businesses or merchants in the local geographical area, local customers in the local geographical area, good or services delivered in the local geographical area, goods or services consumed in the local geographical area, etc. In one embodiment, the local profile (203) also contains or reflects information based on the transaction data (109) associated with the local geographical area, such as return on investment for advertisements placed with different publishers, average transaction size, average transaction value, cross selling opportunities, up selling opportunities, etc.

Examples of local businesses or merchants include, a "mom and pop" store, a local retailer, or a national retailer having a local presence. In one embodiment, the local business or merchant is in the category of a small and medium-sized business (SMB).

In one embodiment, the local profile (203) is based on transaction data (109) associated with one business or merchant that may be inside or outside the local geographical area. The business or merchant is to seek advertising services to be performed on its behalf, such as the selection and/or presentation of advertisements to the user (101).

In one embodiment, the local profile (203) is used by the operator of the transaction handler (103) to create an advertising campaign on behalf of the business for which advertisements will be presented. In one embodiment, the business is located in a particular local geographical area. In one embodiment, the business is a SMB local to the geographical area.

In one embodiment, the advertising campaign is an online advertising campaign. A person affiliated with the business, such as an owner or employee of the business, is to visit a website of the portal (143) to register the advertisement data (135) for the advertising campaign.

In one embodiment, the portal (143) is a website of an issuer bank (or an acquirer bank). The website includes functionality to allow the person affiliated with the business to select an option to create an advertising campaign for the business.

Upon receipt of the option, the portal (143) is to automatically create an advertising campaign with a publisher, such as Google, Bing, a local online newspaper, etc., to present advertisements promoting the business. In one embodiment, the advertising campaign may relate to online presentation of advertisements in search results. For example, in one embodiment, the portal (143) is configured to select keywords for the advertisements of the business when the placement of the advertisements is based on keywords. For example, in one embodiment, the portal (143) is configured to automatically place bids for the advertisements when the placement of the advertisements is based on the bids, such as a cost per click, a cost per impression, etc. For example, in one embodiment, the portal (143) is configured to automatically determine and/or submit the budget for the advertisement campaign for predetermined periods of time (e.g., a daily budget, a weekly budget, etc.). For example, in one embodiment, the portal (143) is configured to automatically submit the advertisement campaign to a publisher via an Application Programming Interface. Thus, the portal (143) can relieve the business/merchant from the detailed operations to implement the advertisement campaigns in various media channels.

In one embodiment, the profile selector (129) is to identify a local profile (203) determined based on transaction data (109) associated with the business or other transaction data (109) associated with the local geographical area. The portal (143) is to use the local profile (129) to identify parameters for defining the advertising campaign and for identifying, selecting, adjusting, and customizing advertisements (e.g., 205) to be presented to the user (101) on the point of the interaction (107). In one embodiment, such parameters depend on the type of publisher and may include, for example, products or services to be advertised, search terms on which to bid, persons to whom the advertisement may be displayed, etc.

In one embodiment, the search parameters are used by the portal (143) of the transaction handler (103) to automatically define and create an advertising campaign without direct involvement by the business. In one embodiment, the portal (143) of the transaction handler (103) and the publisher together create the advertising campaign.

In one embodiment, the performance of the advertising campaign is displayed as a dashboard or in some other manner on the portal (143) of the transaction handler (103) (or the issuer processor (145), or the acquirer processor (147)) for presentation to the business or merchant. In one embodiment, return on investment for the advertising campaign is tracked by the portal (143) via the correlator (117), which correlates the advertisement (205) with purchases in the transaction data (109) that are results of the advertisement (205). In one embodiment, the correlation is based at least in part on the redemption of an offer provided in the advertisement (205), such as a discount, a rebate, cash back, etc., which is fulfilled via the transaction handler (103). The return on investment information is organized to present its distribution across individual media channels used to deliver the advertisements, its distribution over a period of time, etc. In one embodiment, the portal (143) is to display the return on investment information to the business to assist the business in controlling the advertisement campaign. In one embodiment, the portal (143) is to automatically adjust the advertisement campaign to improve and/or maximize the return on investment.

In one embodiment, the local profile (203) is used by the portal (143) to create an advertising campaign in a traditional or print media on behalf of the business for which advertisements (205) will be presented.

In one embodiment, the local profile (203) is provided to a publisher (e.g., media controller (115)) to allow the publisher to appropriately select a targeted advertisement. In one embodiment, the provision of the local profile (203) occurs in real time via the portal (143). In one embodiment, the transaction profiles (127) are provided to the publisher in a batch mode, and the publisher operates the profile selector (129) to select an appropriate local profile (203) with which to select an advertisement.

In one embodiment, a portion of the transaction data (109) associated with the local geographical area is contained in the transaction profiles (127). Based on the user data (125), the profile selector (129) is to select a local profile (203) from the transaction profiles (127) to identify an advertisement (205) to be presented to a user (101) on behalf of a business. For example, if the user (101) is interested in purchasing a good or service from a merchant in a particular local geographical area, then a local profile (203) based on local merchants in the particular local geographical area is selected by the profile selector (129). As another example, a local profile (203) based on local merchants in the particular local geographical area that offer goods or services that are the same as, similar to, or related to the good or service of interest is selected by the profile selector (129).

In one embodiment, the local profile (203) is used to identify a targeted advertisement for presentation to the user (101). If, for example, the user (101) is located in a particular local geographical area (and the identity of the user (101) cannot be linked to a consumer account (146) of the user (101)), a local profile (203) based on customers in the particular local geographical area is selected by the profile selector (129) to represent the spending behavior of the user (101). As another example, a local profile (203) based on the customers in the particular local geographical area who are demographically similar to the user (101) is selected by the profile selector (129) for targeting the advertisement (205) at the user (101). As yet another example, a local profile (203) based on the customers in the particular local geographical area who are demographically similar to the user (101) and who are interested in purchasing the same or similar good or service is selected for targeting the advertisement (205) at the user (101). In one embodiment, the local profile (203) is used to identify a targeted advertisement (205) for presentation to the user (101) at the point of interaction (107) via the advertisement server (201). In some embodiments, the advertisement server (201) is part of the portal (143).

The local profile (203) may be more or less specific or granular. For example, in one embodiment, the granularity of the selected local profile depends on the number and types of users represented by the user data (125) and considered by the profile selector (129). For example, in one embodiment, the local profile (203) is provided for a traditional print medium, such as a print newspaper; and the local profile (203) is based on aggregate transaction data (109) according to the user data (125) at a demographic level associated with the local geographical area in which the print newspaper is published.

In one embodiment, the portal (143) of the transaction handler (103) is to use a local profile (203) to select an advertisement (205) and present or publish the selected advertisement (205) for the business.

Figure 11:
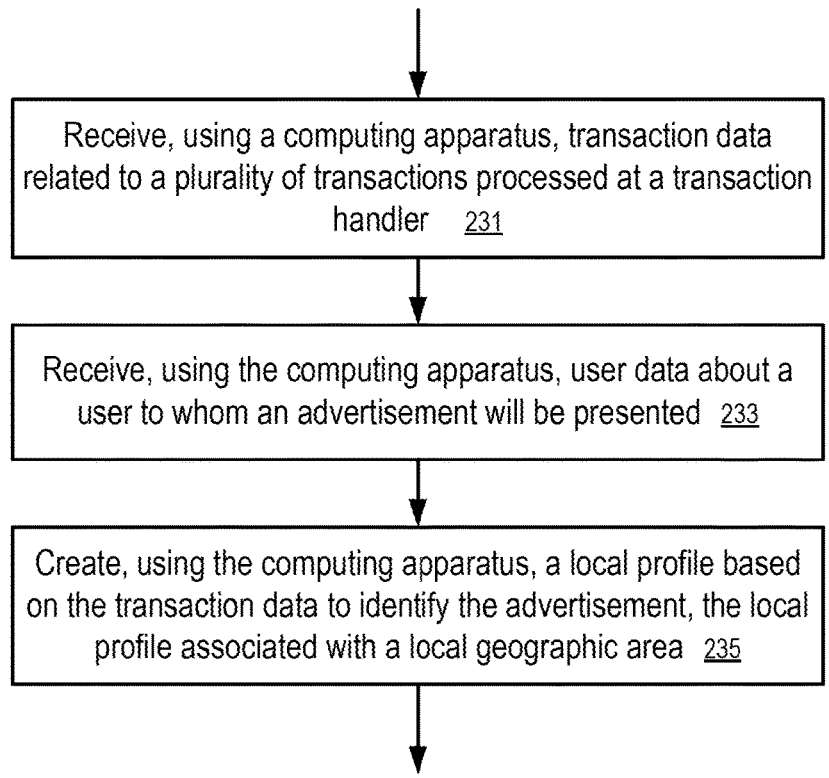
FIG. 11 shows a method to provide advertising services based on a local profile according to one embodiment.

FIG. 11 shows a method to provide advertising services based on a local profile according to another embodiment. In FIG. 11, a computing apparatus is to receive (231) transaction data (109) related to a plurality of transactions processed at a transaction handler (103), to receive (233) user data (125) about a user (101) to whom an advertisement (205) will be presented; and to create (235) (or select or identify) a local profile (203) based on the transaction data (109) to identify the advertisement (205). The local profile (205) is associated with a local geographical area.

In one embodiment, the computing apparatus includes at least one of: a data warehouse (149), a profile generator (121), a portal (143), a profile selector (129), an advertisement selector (133), an advertisement server (201) and a correlator (117). Details about the transaction handler (103) and the portal (143) in one embodiment are provided in the section entitled "TRANSACTION DATA BASED PORTAL."

In one embodiment, the computing apparatus is to receive transaction data (109) related to a plurality of transactions processed at a transaction handler (103), and generate a profile (203), based on the transaction data (109), to summarize transactions in a geographical area. In one embodiment, each of the transactions being processed by the transaction handler (103) is to make a payment from an issuer to an acquirer via the transaction handler (103) in response to an account identifier of a customer, as issued by the issuer, being submitted by a merchant to the acquirer; and the issuer is to make the payment on behalf of the customer, and the acquirer to receive the payment on behalf of the merchant.

In one embodiment, the computing apparatus is to provide the profile (203) to a media distributor (e.g., the media controller (115), the advertisement server (201), etc.) to target advertisements (e.g., 205) to an audience in the geographical area. In one embodiment, the transactions summarized by the profile (203) are between a plurality of merchants and a plurality of customers of the plurality of merchants.

In one embodiment, the computing apparatus is to receive user data (125) about a user (101) to whom an advertisement (205) will be presented; and the user data (125) identifies the geographical area. The computing apparatus is to provide the profile (203) in response to the user data (125) to facilitate the selection of the advertisement (205).

In one embodiment, the computing apparatus is to receive user data (125) about a user (101) to whom an advertisement (205) will be presented; and the user data (125) identifies the geographical area. The computing apparatus is to identify the advertisement (205) using the profile (203).

In one embodiment, the transactions summarized by the profile (203) are between a single business promoted by the advertisement (205) and customers of the business.

In one embodiment, the computing apparatus is to receive advertisement data (135) from a first merchant and manage an advertisement campaign on behalf of the first merchant based on the profile (203). In one embodiment, the advertisement data (135) includes at least an offer such as a discount, incentive, reward, coupon, gift, cash back, benefit, product, and service. In one embodiment, the redemption of the offer provided in the advertisement is fulfilled via the transaction handler (103); and the redemption of the offer correlates a purchase that qualifies for the redemption of the offer to the advertisement (205) that provides the offer. The correlation is used to determine return on investment information for the advertisement campaign.

In one embodiment, the profile (203 or 341) summarizes transactions in the geographical area using a plurality of values (e.g., 343-346) representing aggregated spending in various spending areas.

In one embodiment, the computing apparatus is to select the transactions summarized by the profile (203 or 341), based on whether merchants of the transactions are in the local geographical area.

In one embodiment, the computing apparatus is to select the transactions summarized by the profile (203 or 341), based on whether customers of the transactions reside in the local geographical area.

In one embodiment, each of the plurality of values (e.g., 343-346) indicates a level of aggregated spending of a plurality of users in the geographical area. In one embodiment, the values (e.g., 344) are computed based on factor definitions (331) identified from a factor analysis (327) of a plurality of variables (e.g., 311-315).

In one embodiment, the factor analysis (327) is based on transaction data (109) associated with a plurality of users. In one embodiment, the variables (e.g., 311-315) aggregate the transactions based on merchant categories in the geographical area. In one embodiment, the variables (e.g., 311-315) include spending frequency variables (313) and spending amount variables (315). In one embodiment, the profile (203) is generated based on cluster definitions (333) and factor definitions (331). Details about the profile (e.g., 133 or 341) in one embodiment are provided in the section entitled "TRANSACTION PROFILE" and the section entitled "AGGREGATED SPENDING PROFILE."

In one embodiment, a system includes: a transaction handler (103) to process transactions; a data warehouse (149) to store transaction data (109) recording the transactions processed at the transaction handler (103); a profile generator (121) to generate, based on the transaction data, a profile (203) including a plurality of values (343-346) representing aggregated spending in various spending areas to summarize transactions in a geographical area; and a portal (143) to receive advertisement data (135) from an advertiser, and to create an advertisement campaign based on the profile (203) to deliver advertisements (205) on behalf of the advertiser using one or more media channels. In one embodiment, the system delivers the advertisements (e.g., 205) to users (e.g., 101) in the geographical area. Details about targeting advertisement in one embodiment are provided in the section entitled "TARGETING ADVERTISEMENT."

Details about the system in one embodiment are provided in the section entitled "CENTRALIZED DATA WAREHOUSE" and "HARDWARE."

Variations

Some embodiments use more or fewer components than those illustrated in the figures.

In one embodiment, at least some of the profile generator (121), correlator (117), profile selector (129), and advertisement selector (133) are controlled by the entity that operates the transaction handler (103). In another embodiment, at least some of the profile generator (121), correlator (117), profile selector (129), and advertisement selector (133) are not controlled by the entity that operates the transaction handler (103).

In one embodiment, the products and/or services purchased by the user (101) are also identified by the information transmitted from the merchants or service providers.

Thus, the transaction data (109) may include identification of the individual products and/or services, which allows the profile generator (121) to generate transaction profiles (127) with fine granularity or resolution. In one embodiment, the granularity or resolution may be at a level of distinct products and services that can be purchased (e.g., stock-keeping unit (SKU) level), or category or type of products or services, or vendor of products or services, etc.

In one embodiment, the entity operating the transaction handler (103) provides the intelligence information in real time as the request for the intelligence information occurs. In other embodiments, the entity operating the transaction handler (103) may provide the intelligence information in batch mode. The intelligence information can be delivered via online communications (e.g., via an application programming interface (API) on a website, or other information server), or via physical transportation of a computer readable media that stores the data representing the intelligence information.

In one embodiment, the intelligence information is communicated to various entities in the system in a way similar to, and/or in parallel with the information flow in the transaction system to move money. The transaction handler (103) routes the information in the same way it routes the currency involved in the transactions.

In one embodiment, the portal (143) provides a user interface to allow the user (101) to select items offered on different merchant websites and store the selected items in a wish list for comparison, reviewing, purchasing, tracking, etc. The information collected via the wish list can be used to improve the transaction profiles (127) and derive intelligence on the needs of the user (101); and targeted advertisements can be delivered to the user (101) via the wish list user interface provided by the portal (143). Examples of user interface systems to manage wish lists are provided in U.S. patent application Ser. No. 12/683,802, filed Jan. 7, 2010, assigned U.S. Pat. App. Pub. No. 2010/0174623, and entitled "System and Method for Managing Items of Interest Selected from Online Merchants," the disclosure of which is hereby incorporated herein by reference.

Aggregated Spending Profile

In one embodiment, the characteristics of transaction patterns of customers are profiled via clusters, factors, and/or categories of purchases. The transaction data (109) may include transaction records (301); and in one embodiment, an aggregated spending profile (341) is generated from the transaction records (301), in a way illustrated in FIG. 2, to summarize the spending behavior reflected in the transaction records (301).

In FIG. 2, each of the transaction records (301) is for a particular transaction processed by the transaction handler (103). Each of the transaction records (301) provides information about the particular transaction, such as the account number (302) of the consumer account (146) used to pay for the purchase, the date (303) (and/or time) of the transaction, the amount (304) of the transaction, the ID (305) of the merchant who receives the payment, the category (306) of the merchant, the channel (307) through which the purchase was made, etc. Examples of channels include online, offline in-store, via phone, etc. In one embodiment, the transaction records (301) may further include a field to identify a type of transaction, such as card-present, card-not-present, etc.

A "card-present" transaction typically involves physically presenting the account identification device (141), such as a financial transaction card, to the merchant (e.g., via swiping a credit card at a POS terminal of a merchant); and a "card-not-present" transaction typically involves presenting the account information (142) of the consumer account (146) to the merchant to identify the consumer account (146) without physically presenting the account identification device (141) to the merchant or the transaction terminal (105).

The transaction records (301) of one embodiment may further include details about the products and/or services involved in the purchase.

When there is voluminous data representing the transaction records (301), the spending patterns reflected in the transaction records (301) can be difficult to recognize by an ordinary person.

In FIG. 2, the voluminous transaction records (301) are summarized (335) into aggregated spending profiles (e.g., 341) to concisely present the statistical spending characteristics reflected in the transaction records (301). The aggregated spending profile (341) uses values derived from statistical analysis to present the statistical characteristics of transaction records (301) of an entity in a way easy to understand by an ordinary person.

In FIG. 2, the transaction records (301) are summarized (335) via factor analysis (327) to condense the variables (e.g., 313, 315) and via cluster analysis (329) to segregate entities by spending patterns.

In FIG. 2, a set of variables (e.g., 311, 313, 315) are defined based on the parameters recorded in the transaction records (301). The variables (e.g., 311, 313, and 315) are defined in a way to have meanings easily understood by an ordinary person. For example, variables (311) measure the aggregated spending in super categories; variables (313) measure the spending frequencies in various areas; and variables (315) measure the spending amounts in various areas. In one embodiment, each of the areas is identified by a merchant category (306) (e.g., as represented by a merchant category code (MCC), a North American Industry Classification System (NAICS) code, or a similarly standardized category code). In other embodiments, an area may be identified by a product category, a SKU number, etc.

Examples of the spending frequency variables (313) and spending amount variables (315) defined for various merchant categories (e.g., 306) in one embodiment are provided in U.S. patent application Ser. No. 12/537,566, filed Aug. 7, 2009, assigned U.S. Pat. App. Pub. No. 2010/0306029, and entitled "Cardholder Clusters," and in U.S. patent application Ser. No. 12/777,173, filed May 10, 2010, assigned U.S. Pat. App. Pub. No. 2010/0306032, and entitled "Systems and Methods to Summarize Transaction Data," the disclosures of which applications are hereby incorporated herein by reference.

In FIG. 2, the aggregation (317) includes the application of the definitions (309) for these variables (e.g., 311, 313, and 315) to the transaction records (301) to generate the variable values (321). The transaction records (301) are aggregated to generate aggregated measurements (e.g., variable values (321)) that are not specific to a particular transaction, such as frequencies of purchases made with different merchants or different groups of merchants, the amounts spent with different merchants or different groups of merchants, and the number of unique purchases across different merchants or different groups of merchants, etc. The aggregation (317) can be performed for a particular time period and for entities at various levels.

The transaction records (301) can be aggregated according to a buying entity, or a selling entity. For example, the aggregation (317) can be performed at account level, person level, family level, company level, neighborhood level, city level, region level, etc. to analyze the spending patterns across various areas (e.g., sellers, products or services) for the respective aggregated buying entity. For example, the transaction records (301) for a particular merchant having transactions with multiple accounts can be aggregated for a merchant level analysis. For example, the transaction records (301) for a particular merchant group can be aggregated for a merchant group level analysis. The aggregation (317) can be formed separately for different types of transactions, such as transactions made online, offline, via phone, and/or "card-present" transactions vs. "card-not-present" transactions, which can be used to identify the spending pattern differences among different types of transactions.

In FIG. 2, the variable values (e.g., 323, 324, . . . , 325) associated with an entity ID (322) are considered the random samples of the respective variables (e.g., 311, 313, 315), sampled for the instance of an entity represented by the entity ID (322). Statistical analyses (e.g., factor analysis (327) and cluster analysis (329)) are performed to identify the patterns and correlations in the random samples.

Once the cluster definitions (333) are obtained from the cluster analysis (329), the identity of the cluster (e.g., cluster ID (343)) that contains the entity ID (322) can be used to characterize spending behavior of the entity represented by the entity ID (322). The entities in the same cluster are considered to have similar spending behaviors.

In FIG. 2, the random variables (e.g., 313 and 315) as defined by the definitions (309) have certain degrees of correlation and are not independent from each other. For example, merchants of different merchant categories (e.g., 306) may have overlapping business, or have certain business relationships. For example, certain products and/or services of certain merchants have cause and effect relationships. For example, certain products and/or services of certain merchants are mutually exclusive to a certain degree (e.g., a purchase from one merchant may have a level of probability to exclude the user (101) from making a purchase from another merchant). Such relationships may be complex and difficult to quantify by merely inspecting the categories. Further, such relationships may shift over time as the economy changes.

In FIG. 2, a factor analysis (327) is performed to reduce the redundancy and/or correlation among the variables (e.g., 313, 315). The factor analysis (327) identifies the definitions (331) for factors, each of which represents a combination of the variables (e.g., 313, 315). A factor from the factor analysis (327) is a linear combination of a plurality of the aggregated measurements (e.g., variables (313, 315)) determined for various areas (e.g., merchants or merchant categories, products or product categories). Once the relationship between the factors and the aggregated measurements is determined via factor analysis, the values for the factors can be determined from the linear combinations of the aggregated measurements and be used in a transaction profile (127 or 341) to provide information on the behavior of the entity represented by the entity ID (e.g., an account, an individual, a family).

Once the factor definitions (331) are obtained from the factor analysis (327), the factor definitions (331) can be applied to the variable values (321) to determine factor values (344) for the aggregated spending profile (341). Since redundancy and correlation are reduced in the factors, the number of factors is typically much smaller than the number of the original variables (e.g., 313, 315). Thus, the factor values (344) represent the concise summary of the original variables (e.g., 313, 315).

For example, there may be thousands of variables on spending frequency and amount for different merchant categories; and the factor analysis (327) can reduce the factor number to less than one hundred (and even less than twenty). In one example, a twelve-factor solution is obtained, which allows the use of twelve factors to combine the thousands of the original variables (313, 315); and thus, the spending behavior in thousands of merchant categories can be summarized via twelve factor values (344). In one embodiment, each factor is combination of at least four variables; and a typical variable has contributions to more than one factor.

In FIG. 2, an aggregated spending profile (341) for an entity represented by an entity ID (e.g., 322) includes the cluster ID (343) and factor values (344) determined based on the cluster definitions (333) and the factor definitions (331). The aggregated spending profile (341) may further include other statistical parameters, such as diversity index (342), channel distribution (345), category distribution (346), zip code (347), etc., as further discussed below.

In general, an aggregated spending profile (341) may include more or fewer fields than those illustrated in FIG. 2. For example, in one embodiment, the aggregated spending profile (341) further includes an aggregated spending amount for a period of time (e.g., the past twelve months); in another embodiment, the aggregated spending profile (341) does not include the category distribution (346); and in a further embodiment, the aggregated spending profile (341) may include a set of distance measures to the centroids of the clusters.

FIG. 3 shows a method to generate an aggregated spending profile according to one embodiment. In FIG. 3, computation models are established (351) for variables (e.g., 311, 313, and 315). In one embodiment, the variables are defined in a way to capture certain aspects of the spending statistics, such as frequency, amount, etc.

In FIG. 3, data from related accounts are combined (353); recurrent/installment transactions are combined (355); and account data are selected (357) according to a set of criteria related to activity, consistency, diversity, etc.

In FIG. 3, the computation models (e.g., as represented by the variable definitions (309)) are applied (359) to the remaining account data (e.g., transaction records (301)) to obtain data samples for the variables. The data points associated with the entities, other than those whose transactions fail to meet the minimum requirements for activity, consistency, diversity, etc., are used in factor analysis (327) and cluster analysis (329).

In FIG. 3, the data samples (e.g., variable values (321)) are used to perform (361) factor analysis (327) to identify factor solutions (e.g., factor definitions (331)). The factor solutions can be adjusted (363) to improve similarity in factor values of different sets of transaction data (109).

The data samples can also be used to perform (365) cluster analysis (329) to identify cluster solutions (e.g., cluster definitions (333)). The cluster solutions can be adjusted (367) to improve similarity in cluster identifications based on different sets of transaction data (109). For example, cluster definitions (333) can be applied to the transactions in the time period under analysis (e.g., the past twelve months) and be applied separately to the transactions in a prior time period (e.g., the twelve months before the past twelve months) to obtain two sets of cluster identifications for various entities. The cluster definitions (333) can be adjusted to improve the correlation between the two set of cluster identifications.

Optionally, human understandable characteristics of the factors and clusters are identified (369) to name the factors and clusters. For example, when the spending behavior of a cluster appears to be the behavior of an internet loyalist, the cluster can be named "internet loyalist" such that if a cardholder is found to be in the "internet loyalist" cluster, the spending preferences and patterns of the cardholder can be easily perceived.

In one embodiment, the factor analysis (327) and the cluster analysis (329) are performed periodically (e.g., once a year, or six months) to update the factor definitions (331) and the cluster definitions (333), which may change as the economy and the society change over time.

In FIG. 3, transaction data (109) are summarized (371) using the factor solutions and cluster solutions to generate the aggregated spending profile (341). The aggregated spending profile (341) can be updated more frequently than the factor solutions and cluster solutions, when the new transaction data (109) becomes available. For example, the aggregated spending profile (341) may be updated quarterly or monthly.

Details about aggregated spending profile (341) in one embodiment are provided in U.S. patent application Ser. No. 12/777,173, filed May 10, 2010, assigned U.S. Pat. App. Pub. No. 2010/0306032, and entitled "Systems and Methods to Summarize Transaction Data," the disclosure of which is hereby incorporated herein by reference.

In one embodiment, a set of profiles are generated from the transaction data for a plurality of geographical regions, such as mutually exclusive, non-overlapping regions defined by postal codes. Transactions of account holders residing in the regions are aggregated according to merchant categories for the respective regions and subsequently normalized to obtain preference indicators that reveal the spending preferences of the account holders in the respective regions. Each of the profiles for respective regions is based on a plurality of different account holders and/or households to avoid revealing private information about individual account holders or families. Further, the profiles are constructed in a way to make it impossible to reverse calculate the transaction amounts. Further details and examples about profiles constructed for regions in one embodiment are provided in U.S. patent application Ser. No. 13/675,301, filed Nov. 13, 2012, assigned U.S. Pat. App. Pub. No. 2013/0124263, and entitled "Systems and Methods to Summarize Transaction data," the disclosure of which is hereby incorporated herein by reference.

Transaction Processing and Data

FIG. 4 shows a system to provide information and/or services based on transaction data (109) according to one embodiment.

In FIG. 4, the transaction handler (103) is coupled between an issuer processor (145) and an acquirer processor (147) to facilitate authorization and settlement of transactions between a consumer account (146) and a merchant account (148). The transaction handler (103) records the transactions in the data warehouse (149). The portal (143) is coupled to the data warehouse (149) to provide information based on the transaction records (301), such as the transaction profiles (127), aggregated spending profile (341), offer redemption notification, etc. The portal (143) may be implemented as a web portal, a telephone gateway, a file/data server, etc.

In FIG. 4, the transaction terminal (105) initiates the transaction for a user (101) (e.g., a customer) for processing by a transaction handler (103). The transaction handler (103) processes the transaction and stores transaction data (109) about the transaction, in connection with account data (111), such as the account profile of an account of the user (101). The account data (111) may further include data about the user (101), collected from issuers or merchants, and/or other sources, such as social networks, credit bureaus, merchant provided information, address information, etc. In one embodiment, a transaction may be initiated by a server (e.g., based on a stored schedule for recurrent payments).

The accumulated transaction data (109) and the corresponding account data (111) are used to generate intelligence information about the purchase behavior, pattern, preference, tendency, frequency, trend, amount and/or propensity of the users (e.g., 101), as individuals or as a member of a group. The intelligence information can then be used to generate, identify and/or select targeted advertisements for presentation to the user (101) on the point of interaction (107), during a transaction, after a transaction, or when other opportunities arise.

In FIG. 4, the consumer account (146) is under the control of the issuer processor (145). The consumer account (146) may be owned by an individual, or an organization such as a business, a school, etc. The consumer account (146) may be a credit account, a debit account, or a stored value account. The issuer may provide the consumer (e.g., user (101)) an account identification device (141) to identify the consumer account (146) using the account information (142). The respective consumer of the account (146) can be called an account holder or a cardholder, even when the consumer is not physically issued a card, or the account identification device (141), in one embodiment. The issuer processor (145) is to charge the consumer account (146) to pay for purchases.

The account identification device (141) of one embodiment is a plastic card having a magnetic strip storing account information (142) identifying the consumer account (146) and/or the issuer processor (145). Alternatively, the account identification device (141) is a smartcard having an integrated circuit chip storing at least the account information (142). The account identification device (141) may optionally include a mobile phone having an integrated smartcard.

The account information (142) may be printed or embossed on the account identification device (141). The account information (142) may be printed as a bar code to allow the transaction terminal (105) to read the information via an optical scanner. The account information (142) may be stored in a memory of the account identification device (141) and configured to be read via wireless, contactless communications, such as near field communications via magnetic field coupling, infrared communications, or radio frequency communications. Alternatively, the transaction terminal (105) may require contact with the account identification device (141) to read the account information (142) (e.g., by reading the magnetic strip of a card with a magnetic strip reader).

The transaction terminal (105) is configured to transmit an authorization request message to the acquirer processor (147). The authorization request includes the account information (142), an amount of payment, and information about the merchant (e.g., an indication of the merchant account (148)). The acquirer processor (147) requests the transaction handler (103) to process the authorization request, based on the account information (142) received in the transaction terminal (105). The transaction handler (103) routes the authorization request to the issuer processor (145) and may process and respond to the authorization request when the issuer processor (145) is not available. The issuer processor (145) determines whether to authorize the transaction based at least in part on a balance of the consumer account (146).

The transaction handler (103), the issuer processor (145), and the acquirer processor (147) may each include a subsystem to identify the risk in the transaction and may reject the transaction based on the risk assessment.

The account identification device (141) may include security features to prevent unauthorized uses of the consumer account (146), such as a logo to show the authenticity of the account identification device (141), encryption to protect the account information (142), etc.

The transaction terminal (105) of one embodiment is configured to interact with the account identification device (141) to obtain the account information (142) that identifies the consumer account (146) and/or the issuer processor (145). The transaction terminal (105) communicates with the acquirer processor (147) that controls the merchant account (148) of a merchant. The transaction terminal (105) may communicate with the acquirer processor (147) via a data communication connection, such as a telephone connection, an Internet connection, etc. The acquirer processor (147) is to collect payments into the merchant account (148) on behalf of the merchant.

In one embodiment, the transaction terminal (105) is a POS terminal at a traditional, offline, "brick and mortar" retail store. In another embodiment, the transaction terminal (105) is an online server that receives account information (142) of the consumer account (146) from the user (101) through a web connection. In one embodiment, the user (101) may provide account information (142) through a telephone call, via verbal communications with a representative of the merchant; and the representative enters the account information (142) into the transaction terminal (105) to initiate the transaction.

In one embodiment, the account information (142) can be entered directly into the transaction terminal (105) to make payment from the consumer account (146), without having to physically present the account identification device (141). When a transaction is initiated without physically presenting an account identification device (141), the transaction is classified as a "card-not-present" (CNP) transaction.

In general, the issuer processor (145) may control more than one consumer account (146); the acquirer processor (147) may control more than one merchant account (148); and the transaction handler (103) is connected between a plurality of issuer processors (e.g., 145) and a plurality of acquirer processors (e.g., 147). An entity (e.g., bank) may operate both an issuer processor (145) and an acquirer processor (147).

In one embodiment, the transaction handler (103), the issuer processor (145), the acquirer processor (147), the transaction terminal (105), the portal (143), and other devices and/or services accessing the portal (143) are connected via communications networks, such as local area networks, cellular telecommunications networks, wireless wide area networks, wireless local area networks, an intranet, and Internet. Dedicated communication channels may be used between the transaction handler (103) and the issuer processor (145), between the transaction handler (103) and the acquirer processor (147), and/or between the portal (143) and the transaction handler (103).

In FIG. 4, the transaction handler (103) uses the data warehouse (149) to store the records about the transactions, such as the transaction records (301) or transaction data (109).

Typically, the transaction handler (103) is implemented using a powerful computer, or cluster of computers functioning as a unit, controlled by instructions stored on a computer readable medium. The transaction handler (103) is configured to support and deliver authorization services, exception file services, and clearing and settlement services.

The transaction handler (103) has a subsystem to process authorization requests and another subsystem to perform clearing and settlement services. The transaction handler (103) is configured to process different types of transactions, such credit card transactions, debit card transactions, prepaid card transactions, and other types of commercial transactions. The transaction handler (103) interconnects the issuer processors (e.g., 145) and the acquirer processor (e.g., 147) to facilitate payment communications.

In FIG. 4, the transaction terminal (105) is configured to submit the authorized transactions to the acquirer processor (147) for settlement. The amount for the settlement may be different from the amount specified in the authorization request.

The transaction handler (103) is coupled between the issuer processor (145) and the acquirer processor (147) to facilitate the clearing and settling of the transaction. Clearing includes the exchange of financial information between the issuer processor (145) and the acquirer processor (147); and settlement includes the exchange of funds.

In FIG. 4, the issuer processor (145) is configured to provide funds to make payments on behalf of the consumer account (146). The acquirer processor (147) is to receive the funds on behalf of the merchant account (148). The issuer processor (145) and the acquirer processor (147) communicate with the transaction handler (103) to coordinate the transfer of funds for the transaction. The funds can be transferred electronically.

The transaction terminal (105) may submit a transaction directly for settlement, without having to separately submit an authorization request.

In one embodiment, the portal (143) provides a user interface to allow the user (101) to organize the transactions in one or more consumer accounts (146) of the user with one or more issuers. The user (101) may organize the transactions using information and/or categories identified in the transaction records (301), such as merchant category (306), transaction date (303), amount (304), etc. Examples and techniques in one embodiment are provided in U.S. patent application Ser. No. 11/378,215, filed Mar. 16, 2006, assigned U.S. Pat. App. Pub. No. 2007/0055597, and entitled "Method and System for Manipulating Purchase Information," the disclosure of which is hereby incorporated herein by reference.

In one embodiment, the portal (143) provides transaction based statistics, such as indicators for retail spending monitoring, indicators for merchant benchmarking, industry/market segmentation, indicators of spending patterns, etc. Further examples can be found in U.S. patent application Ser. No. 12/191,796, filed Aug. 14, 2008, assigned U.S. Pat. App. Pub. No. 2009/0048884, and entitled "Merchant Benchmarking Tool," U.S. patent application Ser. No. 12/940,562, filed Nov. 5, 2010, and U.S. patent application Ser. No. 12/940,664, filed Nov. 5, 2010, the disclosures of which applications are hereby incorporated herein by reference.

Transaction Terminal

FIG. 5 illustrates a transaction terminal according to one embodiment. The transaction terminal (105) illustrated in FIG. 5 can be used in various systems discussed in connection with other figures of the present disclosure. In FIG. 5, the transaction terminal (105) is configured to interact with an account identification device (141) to obtain account information (142) about the consumer account (146).

In one embodiment, the transaction terminal (105) includes a memory (167) coupled to the processor (151), which controls the operations of a reader (163), an input device (153), an output device (165) and a network interface (161). The memory (167) may store instructions for the processor (151) and/or data, such as an identification that is associated with the merchant account (148).

In one embodiment, the reader (163) includes a magnetic strip reader. In another embodiment, the reader (163) includes a contactless reader, such as a radio frequency identification (RFID) reader, a near field communications (NFC) device configured to read data via magnetic field coupling (in accordance with ISO standard 14443/NFC), a Bluetooth transceiver, a WiFi transceiver, an infrared transceiver, a laser scanner, etc.

In one embodiment, the input device (153) includes key buttons that can be used to enter the account information (142) directly into the transaction terminal (105) without the physical presence of the account identification device (141). The input device (153) can be configured to provide further information to initiate a transaction, such as a personal identification number (PIN), password, zip code, etc. that may be used to access the account identification device (141), or in combination with the account information (142) obtained from the account identification device (141).

In one embodiment, the output device (165) may include a display, a speaker, and/or a printer to present information, such as the result of an authorization request, a receipt for the transaction, an advertisement, etc.

In one embodiment, the network interface (161) is configured to communicate with the acquirer processor (147) via a telephone connection, an Internet connection, or a dedicated data communication channel.

In one embodiment, the instructions stored in the memory (167) are configured at least to cause the transaction terminal (105) to send an authorization request message to the acquirer processor (147) to initiate a transaction. The transaction terminal (105) may or may not send a separate request for the clearing and settling of the transaction. The instructions stored in the memory (167) are also configured to cause the transaction terminal (105) to perform other types of functions discussed in this description.

In one embodiment, a transaction terminal (105) may have fewer components than those illustrated in FIG. 5. For example, in one embodiment, the transaction terminal (105) is configured for "card-not-present" transactions; and the transaction terminal (105) does not have a reader (163).

In one embodiment, a transaction terminal (105) may have more components than those illustrated in FIG. 5. For example, in one embodiment, the transaction terminal (105) is an ATM machine, which includes components to dispense cash under certain conditions.

Account Identification Device

FIG. 6 illustrates an account identifying device according to one embodiment. In FIG. 6, the account identification device (141) is configured to carry account information (142) that identifies the consumer account (146).

In one embodiment, the account identification device (141) includes a memory (167) coupled to the processor (151), which controls the operations of a communication device (159), an input device (153), an audio device (157) and a display device (155). The memory (167) may store instructions for the processor (151) and/or data, such as the account information (142) associated with the consumer account (146).

In one embodiment, the account information (142) includes an identifier identifying the issuer (and thus the issuer processor (145)) among a plurality of issuers, and an identifier identifying the consumer account among a plurality of consumer accounts controlled by the issuer processor (145). The account information (142) may include an expiration date of the account identification device (141), the name of the consumer holding the consumer account (146), and/or an identifier identifying the account identification device (141) among a plurality of account identification devices associated with the consumer account (146).

In one embodiment, the account information (142) may further include a loyalty program account number, accumulated rewards of the consumer in the loyalty program, an address of the consumer, a balance of the consumer account (146), transit information (e.g., a subway or train pass), access information (e.g., access badges), and/or consumer information (e.g., name, date of birth), etc.

In one embodiment, the memory includes a nonvolatile memory, such as magnetic strip, a memory chip, a flash memory, a Read Only Memory (ROM), etc. to store the account information (142).

In one embodiment, the information stored in the memory (167) of the account identification device (141) may also be in the form of data tracks that are traditionally associated with credits cards. Such tracks include Track 1 and Track 2. Track 1 ("International Air Transport Association") stores more information than Track 2, and contains the cardholder's name as well as the account number and other discretionary data. Track 1 is sometimes used by airlines when securing reservations with a credit card. Track 2 ("American Banking Association") is currently most commonly used and is read by ATMs and credit card checkers. The ABA (American Banking Association) designed the specifications of Track 1 and banks abide by it. It contains the cardholder's account number, encrypted PIN, and other discretionary data.

In one embodiment, the communication device (159) includes a semiconductor chip to implement a transceiver for communication with the reader (163) and an antenna to provide and/or receive wireless signals.

In one embodiment, the communication device (159) is configured to communicate with the reader (163). The communication device (159) may include a transmitter to transmit the account information (142) via wireless transmissions, such as radio frequency signals, magnetic coupling, or infrared, Bluetooth or WiFi signals, etc.

In one embodiment, the account identification device (141) is in the form of a mobile phone, personal digital assistant (PDA), etc. The input device (153) can be used to provide input to the processor (151) to control the operation of the account identification device (141); and the audio device (157) and the display device (155) may present status information and/or other information, such as advertisements or offers. The account identification device (141) may include further components that are not shown in FIG. 6, such as a cellular communications subsystem.

In one embodiment, the communication device (159) may access the account information (142) stored on the memory (167) without going through the processor (151).

In one embodiment, the account identification device (141) has fewer components than those illustrated in FIG. 6. For example, an account identification device (141) does not have the input device (153), the audio device (157) and the display device (155) in one embodiment; and in another embodiment, an account identification device (141) does not have components (151-159).

For example, in one embodiment, an account identification device (141) is in the form of a debit card, a credit card, a smartcard, or a consumer device that has optional features such as magnetic strips, or smartcards.

An example of an account identification device (141) is a magnetic strip attached to a plastic substrate in the form of a card. The magnetic strip is used as the memory (167) of the account identification device (141) to provide the account information (142). Consumer information, such as account number, expiration date, and consumer name may be printed or embossed on the card. A semiconductor chip implementing the memory (167) and the communication device (159) may also be embedded in the plastic card to provide account information (142) in one embodiment. In one embodiment, the account identification device (141) has the semiconductor chip but not the magnetic strip.

In one embodiment, the account identification device (141) is integrated with a security device, such as an access card, a radio frequency identification (RFID) tag, a security card, a transponder, etc.

In one embodiment, the account identification device (141) is a handheld and compact device. In one embodiment, the account identification device (141) has a size suitable to be placed in a wallet or pocket of the consumer.

Some examples of an account identification device (141) include a credit card, a debit card, a stored value device, a payment card, a gift card, a smartcard, a smart media card, a payroll card, a health care card, a wrist band, a keychain device, a supermarket discount card, a transponder, and a machine readable medium containing account information (142).

Point of Interaction

In one embodiment, the point of interaction (107) is to provide an advertisement to the user (101), or to provide information derived from the transaction data (109) to the user (101).

In one embodiment, an advertisement is a marketing interaction which may include an announcement and/or an offer of a benefit, such as a discount, incentive, reward, coupon, gift, cash back, or opportunity (e.g., special ticket/admission). An advertisement may include an offer of a product or service, an announcement of a product or service, or a presentation of a brand of products or services, or a notice of events, facts, opinions, etc. The advertisements can be presented in text, graphics, audio, video, or animation, and as printed matter, web content, interactive media, etc. An advertisement may be presented in response to the presence of a financial transaction card, or in response to a financial transaction card being used to make a financial transaction, or in response to other user activities, such as browsing a web page, submitting a search request, communicating online, entering a wireless communication zone, etc. In one embodiment, the presentation of advertisements may be not a result of a user action.

In one embodiment, the point of interaction (107) can be one of various endpoints of the transaction network, such as point of sale (POS) terminals, automated teller machines (ATMs), electronic kiosks (or computer kiosks or interactive kiosks), self-assist checkout terminals, vending machines, gas pumps, websites of banks (e.g., issuer banks or acquirer banks of credit cards), bank statements (e.g., credit card statements), websites of the transaction handler (103), websites of merchants, checkout websites or web pages for online purchases, etc.

In one embodiment, the point of interaction (107) may be the same as the transaction terminal (105), such as a point of sale (POS) terminal, an automated teller machine (ATM), a mobile phone, a computer of the user for an online transaction, etc. In one embodiment, the point of interaction (107) may be co-located with, or near, the transaction terminal (105) (e.g., a video monitor or display, a digital sign), or produced by the transaction terminal (e.g., a receipt produced by the transaction terminal (105)). In one embodiment, the point of interaction (107) may be separate from and not co-located with the transaction terminal (105), such as a mobile phone, a personal digital assistant, a personal computer of the user, a voice mail box of the user, an email inbox of the user, a digital sign, etc.

For example, the advertisements can be presented on a portion of media for a transaction with the customer, which portion might otherwise be unused and thus referred to as a "white space" herein. A white space can be on a printed matter (e.g., a receipt printed for the transaction, or a printed credit card statement), on a video display (e.g., a display monitor of a POS terminal for a retail transaction, an ATM for cash withdrawal or money transfer, a personal computer of the customer for online purchases), or on an audio channel (e.g., an interactive voice response (IVR) system for a transaction over a telephonic device).

In one embodiment, the white space is part of a media channel available to present a message from the transaction handler (103) in connection with the processing of a transaction of the user (101). In one embodiment, the white space is in a media channel that is used to report information about a transaction of the user (101), such as an authorization status, a confirmation message, a verification message, a user interface to verify a password for the online use of the account information (142), a monthly statement, an alert or a report, or a web page provided by the portal (143) to access a loyalty program associated with the consumer account (146) or a registration program.

In other embodiments, the advertisements can also be presented via other media channels which may not involve a transaction processed by the transaction handler (103). For example, the advertisements can be presented on publications or announcements (e.g., newspapers, magazines, books, directories, radio broadcasts, television, digital signage, etc., which may be in an electronic form, or in a printed or painted form). The advertisements may be presented on paper, on websites, on billboards, on digital signs, or on audio portals.

In one embodiment, the transaction handler (103) purchases the rights to use the media channels from the owner or operators of the media channels and uses the media channels as advertisement spaces. For example, white spaces at a point of interaction (e.g., 107) with customers for transactions processed by the transaction handler (103) can be used to deliver advertisements relevant to the customers conducting the transactions; and the advertisement can be selected based at least in part on the intelligence information derived from the accumulated transaction data (109) and/or the context at the point of interaction (107) and/or the transaction terminal (105).

In general, a point of interaction (e.g., 107) may or may not be capable of receiving inputs from the customers, and may or may not co-located with a transaction terminal (e.g., 105) that initiates the transactions. The white spaces for presenting the advertisement on the point of interaction (107) may be on a portion of a geographical display space (e.g., on a screen), or on a temporal space (e.g., in an audio stream).

In one embodiment, the point of interaction (107) may be used to primarily to access services not provided by the transaction handler (103), such as services provided by a search engine, a social networking website, an online marketplace, a blog, a news site, a television program provider, a radio station, a satellite, a publisher, etc.

In one embodiment, a consumer device is used as the point of interaction (107), which may be a non-portable consumer device or a portable computing device. The consumer device is to provide media content to the user (101) and may receive input from the user (101).

Examples of non-portable consumer devices include a computer terminal, a television set, a personal computer, a set-top box, or the like. Examples of portable consumer devices include a portable computer, a cellular phone, a personal digital assistant (PDA), a pager, a security card, a wireless terminal, or the like. The consumer device may be implemented as a data processing system as illustrated in FIG. 7, with more or fewer components.

In one embodiment, the consumer device includes an account identification device (141). For example, a smart card used as an account identification device (141) is integrated with a mobile phone, or a personal digital assistant (PDA).

In one embodiment, the point of interaction (107) is integrated with a transaction terminal (105). For example, a self-service checkout terminal includes a touch pad to interact with the user (101); and an ATM machine includes a user interface subsystem to interact with the user (101).

Hardware

In one embodiment, a computing apparatus is configured to include some of the components of systems illustrated in various figures, such as the transaction handler (103), the profile generator (121), the media controller (115), the portal (143), the profile selector (129), the advertisement selector (133), the user tracker (113), the correlator, and their associated storage devices, such as the data warehouse (149).

In one embodiment, at least some of the components such as the transaction handler (103), the transaction terminal (105), the point of interaction (107), the user tracker (113), the media controller (115), the correlator (117), the profile generator (121), the profile selector (129), the advertisement selector (133), the portal (143), the issuer processor (145), the acquirer processor (147), and the account identification device (141), can be implemented as a computer system, such as a data processing system (170) illustrated in FIG. 7. Some of the components may share hardware or be combined on a computer system. In one embodiment, a network of computers can be used to implement one or more of the components.

Further, the data illustrated in the figures, such as transaction data (109), account data (111), transaction profiles (127), and advertisement data (135), can be stored in storage devices of one or more computers accessible to the corresponding components. For example, the transaction data (109) can be stored in the data warehouse (149) that can be implemented as a data processing system illustrated in FIG. 7, with more or fewer components.

In one embodiment, the transaction handler (103) is a payment processing system, or a payment card processor, such as a card processor for credit cards, debit cards, etc.

FIG. 7 illustrates a data processing system according to one embodiment. While FIG. 7 illustrates various components of a computer system, it is not intended to represent any particular architecture or manner of interconnecting the components. One embodiment may use other systems that have fewer or more components than those shown in FIG. 7.

In FIG. 7, the data processing system (170) includes an inter-connect (171) (e.g., bus and system core logic), which interconnects a microprocessor(s) (173) and memory (167). The microprocessor (173) is coupled to cache memory (179) in the example of FIG. 7.

In one embodiment, the inter-connect (171) interconnects the microprocessor(s) (173) and the memory (167) together and also interconnects them to input/output (I/O) device(s) (175) via I/O controller(s) (177). I/O devices (175) may include a display device and/or peripheral devices, such as mice, keyboards, modems, network interfaces, printers, scanners, video cameras and other devices known in the art. In one embodiment, when the data processing system is a server system, some of the I/O devices (175), such as printers, scanners, mice, and/or keyboards, are optional.

In one embodiment, the inter-connect (171) includes one or more buses connected to one another through various bridges, controllers and/or adapters. In one embodiment the I/O controllers (177) include a USB (Universal Serial Bus) adapter for controlling USB peripherals, and/or an IEEE-1394 bus adapter for controlling IEEE-1394 peripherals.

In one embodiment, the memory (167) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Other Aspects

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

The disclosures of the above discussed patent documents are hereby incorporated herein by reference.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computer-implemented method for enhancing search engine results, comprising:
    processing, with a transaction handler, a plurality of transactions between a plurality of account holders and a plurality of merchants, resulting in transaction data;
    storing transaction data in a data warehouse in communication with a transaction handler;
    receiving, by a computing apparatus in communication with the transaction handler, a request for activity data from a search engine, the search engine in communication with the computing apparatus and configured to identify search results based on a search request, the search results identifying a merchant of the plurality of merchants;
    identifying, by the computing apparatus from the transaction data stored in the data warehouse, a set of transactions corresponding to the merchant from the plurality of transactions processed by the transaction handler; and
    deriving, by the computing apparatus, activity data for the merchant based at least partially on the set of transactions, the activity data comprising at least one of the following: business hours of the merchant, days the merchant is open or closed, peak business times for the merchant, an active or inactive status of the merchant, or any combination thereof, wherein the activity data is configured to cause the search engine to enhance the search results based on the activity data such that at least a portion of the activity data is presented within a search result corresponding to the merchant.

2. The computer-implemented method of claim 1, further comprising generating a transaction profile for the merchant comprising the activity data, wherein communicating the activity data to the search engine comprises communicating the transaction profile for the merchant to the search engine.

3. The computer-implemented method of claim 1, wherein the activity data is derived from the set of transactions in response to receiving the request for activity data from the search engine.

4. The computer-implemented method of claim 1, wherein the activity data is derived from the set of transactions and communicated to the search engine periodically.

5. The computer-implemented method of claim 1, wherein the activity data comprises the business hours of the merchant, and wherein the activity data is derived by generating a statistical starting point of time and a statistical ending point of time based on a distribution of the set of transactions at the merchant.

6. The computer-implemented method of claim 1, wherein the activity data comprises the peak business times for the merchant, further comprising communicating an offer to the search engine to be presented based on off-peak hours or days for the merchant.

7. The computer-implemented method of claim 1, wherein the activity data comprises the business hours of the merchant and/or days the merchant is open or closed, further comprising monitoring transaction patterns for the set of transactions for the merchant to detect a change in the business hours of the merchant and/or the days the merchant is open or closed.

8. The computer-implemented method of claim 1, wherein the activity data comprises the inactive status of the merchant, and wherein deriving the activity data comprises determining that a transaction count for the merchant has satisfied a threshold.

9. The computer-implemented method of claim 1, wherein the request for activity data identifies the merchant of the plurality of merchants and is received by a portal in communication with the search engine and the data warehouse.

10. A system for enhancing search engine results based on transaction data resulting from processing a plurality of transactions between a plurality of account holders and a plurality of merchant with a transaction handler, comprising:
 a data warehouse in communication with the transaction handler and configured to store the transaction data; and
 at least one computing apparatus in communication with the transaction handler, the data warehouse, and a search engine, the at least one computing apparatus including at least one processor programmed or configured to:
  receive a request for activity data from the search engine, the search engine configured to identify search results based on a search request, the search results identifying a merchant of the plurality of merchants;
  identify, from the transaction data stored in the data warehouse, a set of transactions corresponding to the merchant from the plurality of transactions processed by the transaction handler; and
  derive activity data for the merchant based at least partially on the set of transactions, the activity data comprising at least one of the following: business hours of the merchant, days the merchant is open or closed, peak business times for the merchant, an active or inactive status of the merchant, or any combination thereof, wherein the activity data is configured to cause the search engine to enhance the search results based on the activity data such that at least a portion of the activity data is presented within a search result corresponding to the merchant.

11. The system of claim 10, wherein the at least one processor is further configured to generate a transaction profile for the merchant comprising the activity data, and wherein communicating the activity data to the search engine comprises communicating the transaction profile for the merchant to the search engine.

12. The system of claim 10, wherein the activity data is derived from the set of transactions in response to receiving the request for activity data from the search engine.

13. The system of claim 10, wherein the activity data is derived from the set of transactions and communicated to the search engine periodically.

14. The system of claim 10, wherein the activity data comprises the business hours of the merchant, and wherein the activity data is derived by generating a statistical starting point of time and a statistical ending point of time based on a distribution of the set of transactions at the merchant.

15. The system of claim 10, wherein the activity data comprises the peak business times for the merchant, further comprising communicating an offer to the search engine to be presented based on off-peak hours or days for the merchant.

16. The system of claim 10, wherein the activity data comprises the business hours of the merchant and/or days the merchant is open or closed, further comprising monitoring transaction patterns for the set of transactions for the merchant to detect a change in the business hours of the merchant and/or the days the merchant is open or closed.

17. The system of claim 10, wherein the activity data comprises the inactive status of the merchant, and wherein deriving the activity data comprises determining that a transaction count for the merchant has satisfied a threshold.

18. The system of claim 10, wherein the request for activity data identifies the merchant of the plurality of merchants and is received by a portal in communication with the search engine and the data warehouse.

19. A computer-implemented method for enhancing search engine results, comprising:
 receiving, by a search engine, a search request from a user;
 generating, by the search engine, search results based on the search request, the search results identifying a merchant;
 communicating, by the search engine to a portal over a network, a request for activity data, the portal in communication with a transaction handler configured in an electronic payment processing network to process a plurality of transactions between a plurality of account holders and a plurality of merchants, including the merchant identified in the search results, resulting in transaction data;
 receiving, by the search engine from the portal, activity data for the merchant based on the transaction data, the activity data comprising at least one of the following: business hours of the merchant, days the merchant is open or closed, peak business times for the merchant, an active or inactive status of the merchant, or any combination thereof;
 enhancing, by the search engine, the search results based on the activity data such that at least a portion of the activity data is presented within a search result corresponding to the merchant.

20. The computer-implemented method of claim 19, wherein the search engine is external to the electronic payment processing network, further comprising:
- identifying, by a computing apparatus in communication with the transaction handler, a set of transactions corresponding to the merchant from the plurality of transactions processed by the transaction handler; and
- deriving, by the computing apparatus, the activity data for the merchant based at least partially on the set of transactions.

* * * * *